US012695405B2

(12) United States Patent
Kobayashi et al.

(10) Patent No.: US 12,695,405 B2
(45) Date of Patent: Jul. 28, 2026

(54) ELECTRIC POWER CONVERSION DEVICE, MOTOR CONTROL DEVICE, AND ELECTRIC POWER STEERING DEVICE

(71) Applicant: NSK STEERING & CONTROL, INC., Tokyo (JP)

(72) Inventors: Takayuki Kobayashi, Tokyo (JP); Keita Yoshida, Tokyo (JP); Kyosho Uryu, Tokyo (JP)

(73) Assignee: NSK STEERING & CONTROL, INC., Tokyo (JP)

( * ) Notice: Subject to any disclaimer, the term of this patent is extended or adjusted under 35 U.S.C. 154(b) by 0 days.

(21) Appl. No.: 19/121,597

(22) PCT Filed: Jan. 12, 2024

(86) PCT No.: PCT/JP2024/000616
§ 371 (c)(1),
(2) Date: Apr. 16, 2025

(87) PCT Pub. No.: WO2024/176645
PCT Pub. Date: Aug. 29, 2024

(65) Prior Publication Data
US 2026/0112989 A1 Apr. 23, 2026

(30) Foreign Application Priority Data

Feb. 22, 2023 (JP) ................................ 2023-026192
Jun. 16, 2023 (JP) ................................ 2023-099434

(51) Int. Cl.
H02P 7/00 (2016.01)
B62D 5/04 (2006.01)
(Continued)

(52) U.S. Cl.
CPC .............. H02P 27/08 (2013.01); B62D 5/046 (2013.01); H02P 21/14 (2013.01)

(58) Field of Classification Search
CPC ................................ B62D 5/046; H02P 21/14
(Continued)

(56) References Cited

U.S. PATENT DOCUMENTS

2012/0118662 A1 5/2012 Sakai et al.
2014/0265954 A1* 9/2014 Kobayashi ................ H02P 6/28
318/400.22
(Continued)

FOREIGN PATENT DOCUMENTS

JP 2009-017671 A 1/2009
JP 2010-220414 A 9/2010
(Continued)

OTHER PUBLICATIONS

International Preliminary Report on Patentability for PCT/JP2024/000616 dated Jun. 10, 2024 (PCT/IPEA/409).
(Continued)

*Primary Examiner* — Erick D Glass
(74) *Attorney, Agent, or Firm* — Sughrue Mion, PLLC

(57) ABSTRACT

A switching control unit, when a target duty ratio of a first phase, the first phase being a phase having the highest target duty ratio among a plurality of phases of a polyphase inverter, is greater than a predetermined first threshold value set to less than 100%, drives a switching element of the first phase at a duty ratio of 100% and also drives a switching element of a second phase, the second phase being a phase other than the first phase, at a corrected duty ratio obtained by correcting to increase a target duty ratio of the second phase, and a voltage command value limiting unit limits a q-axis voltage command value and a d-axis voltage command value in such a way that the corrected duty ratio does not exceed a predetermined second threshold value set to less than 100%.

9 Claims, 13 Drawing Sheets

(51) Int. Cl.
*H02P 21/14*          (2016.01)
*H02P 27/08*          (2006.01)
(58) Field of Classification Search
USPC ......................................................... 318/432
See application file for complete search history.

(56)                    References Cited

U.S. PATENT DOCUMENTS

2015/0251692 A1 *   9/2015   Mikamo ............... B60L 15/025
                                                      318/504
2016/0315577 A1 *   10/2016   Suzuki .................... H02P 21/05
2024/0007021 A1     1/2024   Orii et al.

FOREIGN PATENT DOCUMENTS

JP             5396948  B2     1/2014
WO         2022/130480  A1     6/2022

OTHER PUBLICATIONS

International Search Report for PCT/JP2024/000616 dated Apr. 2, 2024 (PCT/ISA/210).

* cited by examiner

FIG. 2

PWM SIGNAL DRIVING
UPPER-SIDE ARM FET OF
MAXIMUM PHASE

PWM SIGNAL DRIVING
LOWER-SIDE ARM FET OF
MAXIMUM PHASE

PWM SIGNAL DRIVING
UPPER-SIDE ARM FET OF
INTERMEDIATE PHASE/
MINIMUM PHASE

PWM SIGNAL DRIVING
LOWER-SIDE ARM FET OF
INTERMEDIATE PHASE/
MINIMUM PHASE

TERMINAL VOLTAGE OF
CURRENT DETECTION AD OF
INTERMEDIATE PHASE/
MINIMUM PHASE

FIG. 5 (a)
PWM SIGNAL DRIVING
UPPER-SIDE ARM FET OF
MAXIMUM PHASE
FIG. 5 (b)
PWM SIGNAL DRIVING
LOWER-SIDE ARM FET OF
MAXIMUM PHASE
FIG. 5 (c)
PWM SIGNAL DRIVING
UPPER-SIDE ARM FET OF
INTERMEDIATE PHASE/
MINIMUM PHASE
FIG. 5 (d)
PWM SIGNAL DRIVING
LOWER-SIDE ARM FET OF
INTERMEDIATE PHASE/
MINIMUM PHASE
FIG. 5 (e)
TERMINAL VOLTAGE OF
CURRENT DETECTION AD OF
INTERMEDIATE PHASE/
MINIMUM PHASE
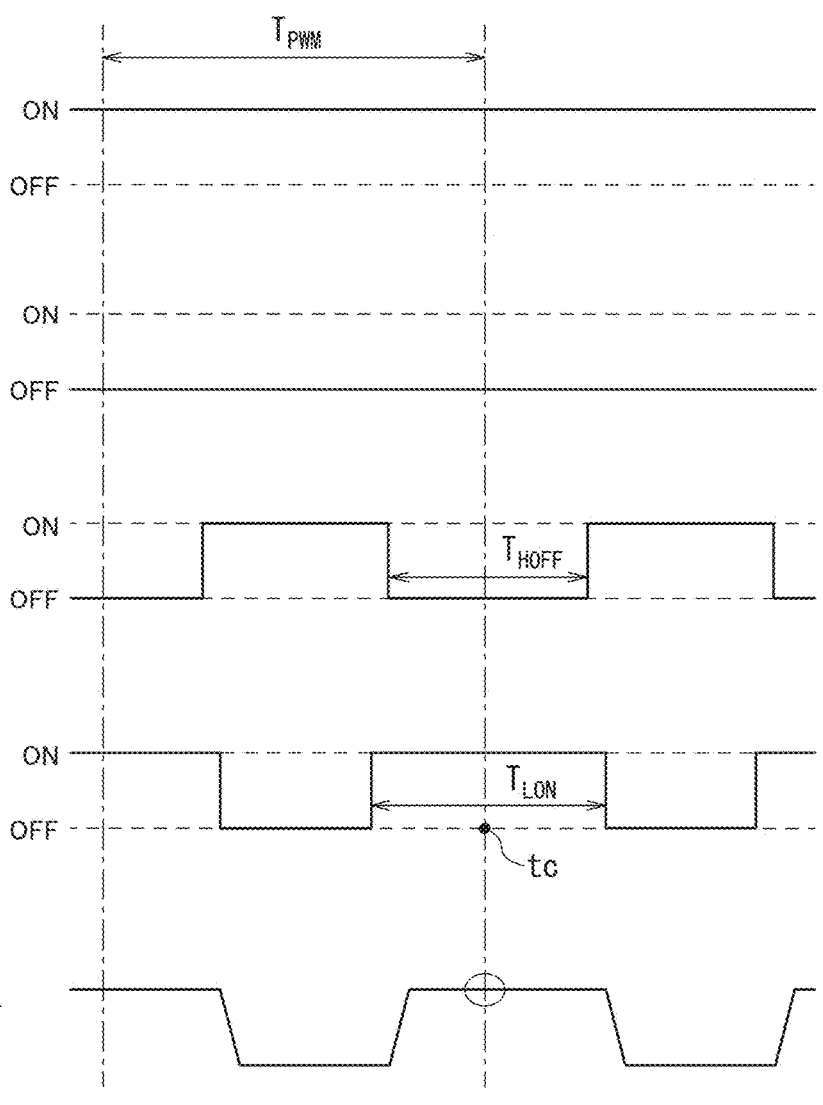
FIG. 6
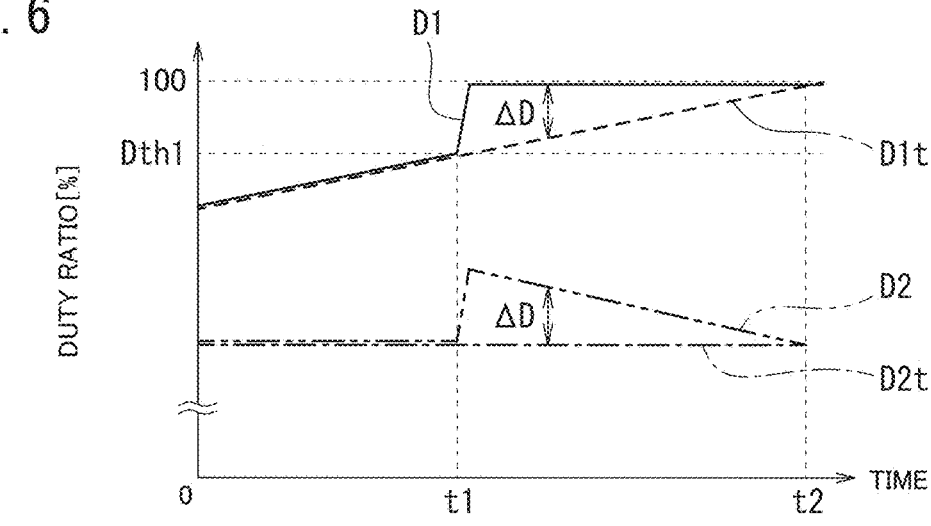

ELECTRIC POWER CONVERSION DEVICE, MOTOR CONTROL DEVICE, AND ELECTRIC POWER STEERING DEVICE

CROSS-REFERENCE TO RELATED APPLICATIONS

This application is a National Stage of International Application No. PCT/JP2024/000616 filed Jan. 12, 2024, claiming priorities based on Japanese Patent Application No. 2023-026192 filed Feb. 22, 2023 and on Japanese Patent Application No. 2023-099434 filed Jun. 16, 2023.

TECHNICAL FIELD

The present invention relates to an electric power conversion device, a motor control device, and an electric power steering device.

BACKGROUND ART

A motor control device described in PTL 1 described below measures phase current, based on a voltage drop across a shunt resistor connected in series to a switching element of a three-phase inverter.

CITATION LIST

Patent Literature

JP 5396948 B

SUMMARY OF INVENTION

Technical Problem

When phase current is measured based on a voltage drop across a shunt resistor connected in series to a switching element of a polyphase inverter, as a duty ratio of a maximum-duty phase that is a phase having a highest duty ratio of PWM control increases, switching timing of ON/OFF states of a switching element of the maximum-duty phase and sampling timing of voltage across the shunt resistor come close to each other. Thus, there has been a risk that switching noise is superimposed on a measured value of the voltage across the shunt resistor and it becomes difficult to correctly detect phase current.

Therefore, in the motor control device described in PTL 1 described above, when a period during which one of switching elements on the low potential side is turned on is shorter than a detection time of a current value, a switching element on the high potential side of a current undetectable phase corresponding to the switching element is maintained in an ON state and the switching element on the low potential side is maintained in an OFF state, and a duty instruction value of a phase other than the current undetectable phase is shifted to the high potential side.

However, when shifting duty instruction values of phases other than the current undetectable phase to the high potential side causes a period during which the switching element on the lower potential side is turned on to become short, there is a risk that it becomes difficult to accurately detect phase current flowing through the shunt resistor.

The present invention has been made in consideration of the above-described circumstances, and an object of the present invention is to, when phase current is measured based on a voltage drop across a resistance element connected in series to a switching element of a polyphase inverter, improve measurement precision when a duty ratio of a maximum-duty phase that is a phase having a highest duty ratio of PWM control is high.

Solution to Problem

In order to achieve the above-described object, according to an aspect of the present invention, there is provided an electric power conversion device including: a polyphase inverter including series connections of an upper-side arm switching element and a lower-side arm switching element of a plurality of phases; a voltage command value generation unit configured to generate a q-axis voltage command value and a d-axis voltage command value for driving the polyphase inverter; a voltage command value limiting unit configured to limit the q-axis voltage command value and the d-axis voltage command value; a voltage command value conversion unit configured to convert the q-axis voltage command value and the d-axis voltage command value limited by the voltage command value limiting unit to a polyphase voltage command value; a switching control unit configured to drive, based on the q-axis voltage command value and the d-axis voltage command value limited by the voltage command value limiting unit, a first switching element, the first switching element being one switching element of the upper-side arm switching element and the lower-side arm switching element, and a second switching element, the second switching element being a switching element of the upper-side arm switching element and the lower-side arm switching element other than the first switching element, by PWM control; and a current measurement unit configured to measure current flowing through the second switching element, based on a voltage drop across a resistance element connected in series to the second switching element.

The switching control unit is configured to: set a target duty ratio, the target duty ratio being a target value of a duty ratio of a period during which the first switching element is turned on to a PWM period, according to a target voltage to be applied to a load of the polyphase inverter; when the target duty ratio of a first phase, the first phase being a phase having the highest target duty ratio among a plurality of phases of the polyphase inverter, is less than or equal to a predetermined first threshold value set to less than 100%, drive the first switching element of the first phase at the target duty ratio; and when the target duty ratio of the first phase is greater than the first threshold value, drive the first switching element of the first phase at the duty ratio of 100% and also drives the first switching element of a second phase, the second phase being a phase of the plurality of phases other than the first phase, at a corrected duty ratio obtained by correcting to increase the target duty ratio of the second phase. The voltage command value limiting unit is configured to limit the q-axis voltage command value and the d-axis voltage command value in such a way that the corrected duty ratio does not exceed a predetermined second threshold value set to less than 100%.

Advantageous Effects of Invention

According to the present invention, it is possible to, when phase current is measured based on a voltage drop across a resistance element connected in series to a switching element of a polyphase inverter, improve measurement precision when a duty ratio of a maximum-duty phase that is a phase having a highest duty ratio of PWM control is high.

BRIEF DESCRIPTION OF DRAWINGS

FIG. 2 is a configuration diagram illustrative of an outline of an example of an electronic control unit (ECU);

FIGS. 5(*a*) to 5(*e*) are other schematic timing diagrams for a description of the switching timing of the switching elements and the current measurement timing;

FIG. 6 is a schematic diagram descriptive of a method for setting duty ratios;

FIG. 12 is a configuration diagram illustrative of an outline of a first variation of the electric power steering device;

FIG. 14 is a configuration diagram illustrative of an outline of a third variation of the electric power steering device.

DESCRIPTION OF EMBODIMENTS

The embodiments of the present invention will be described in detail with reference to the drawings. Note that the embodiments of the present invention given below are examples of apparatuses and methods to embody the technical concept of the invention, and the technical concept of the present invention does not specify the configuration, arrangement, and the like of the components to those given below. The technical concept of the present invention may be modified in various ways within the technical scope defined by the claims.

Configuration

Figure 1:
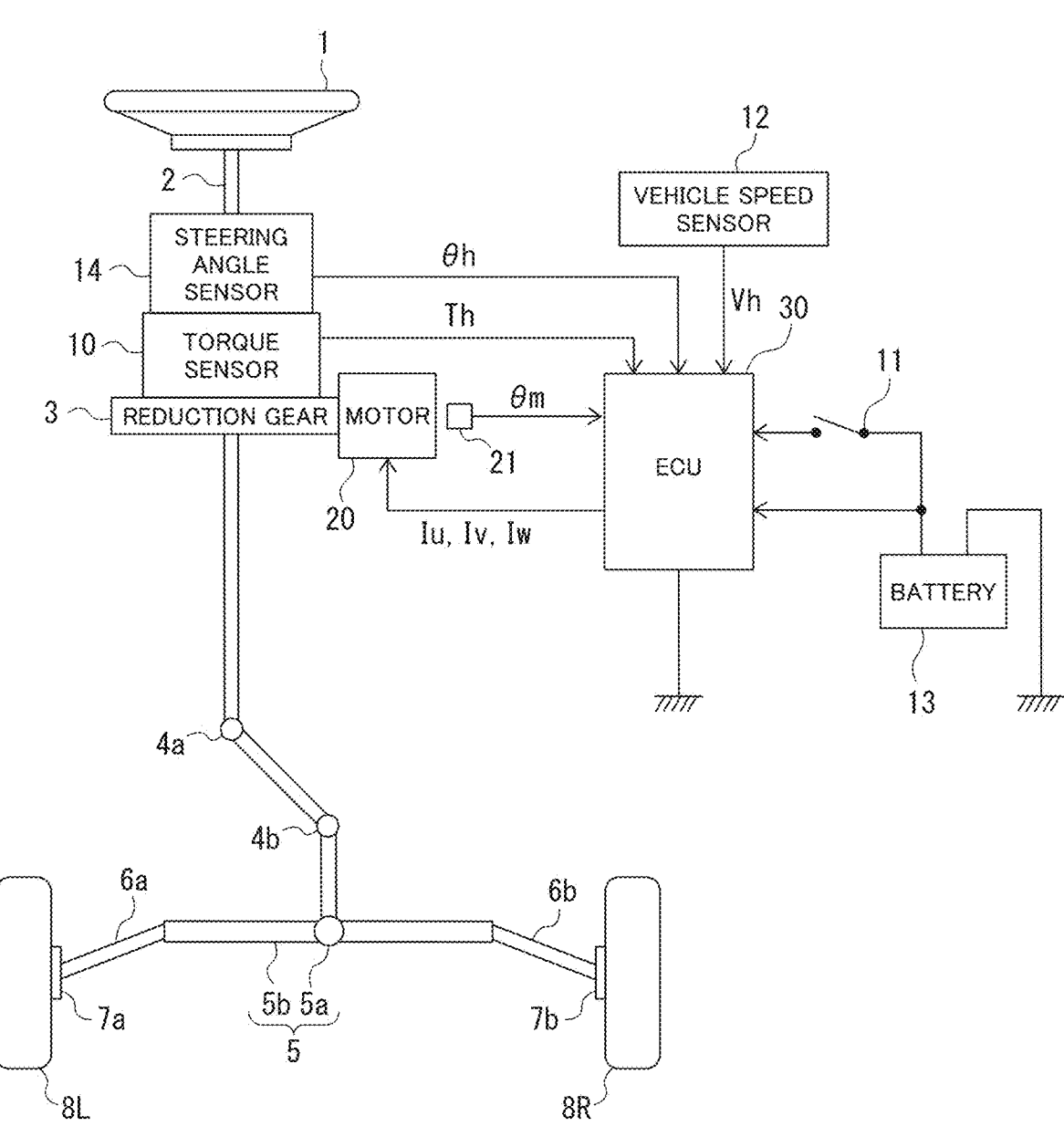
FIG. 1 is a configuration diagram illustrative of an outline of an example of an electric power steering device of an embodiment.

FIG. 1 is a configuration diagram illustrative of an outline of an example of an electric power steering (EPS) device of an embodiment. A steering shaft (steering wheel shaft) 2 of a steering wheel 1 is connected to steered wheels 8L and 8R by way of a reduction gear (worm gear) 3 that constitutes a speed reduction mechanism, universal joints 4*a* and 4*b*, a pinion rack mechanism 5, and tie rods 6*a* and 6*b* and further via hub units 7*a* and 7*b*.

The pinion rack mechanism 5 includes a pinion 5*a* that is coupled to a pinion shaft to which steering force is transmitted from the universal joint 4*b* and a rack 5*b* that meshes with the pinion 5*a*, and converts rotational motion transmitted to the pinion 5*a* to linear motion in the vehicle width direction by means of the rack 5*b*.

To the steering shaft 2, a torque sensor 10 configured to detect steering torque Th is disposed. To the steering shaft 2, a steering angle sensor 14 configured to detect a steering angle θh of the steering wheel 1 is also disposed.

A motor 20 configured to assist steering force of the steering wheel 1 is also connected to the steering shaft 2 via the reduction gear 3. Although an example of a case where the motor 20 is a three-phase motor will be described herein, the number of phases does not have to be three.

To an electronic control unit (ECU) 30 configured to control the electric power steering device, power is supplied from a battery 13 and an ignition key signal is also input by way of an ignition switch 11.

The ECU 30 performs calculation of a current command value of an assist control command, based on steering torque Th detected by the torque sensor 10, vehicle speed Vh detected by a vehicle speed sensor 12, and a steering angle θh detected by the steering angle sensor 14 and controls current to be supplied to the motor 20 (U-phase current Iu, V-phase current Iv, and W-phase current Iw) by a voltage command value obtained by performing compensation and the like on the calculated current command value.

Note that the steering angle sensor 14 is not an essential component and the steering angle θh may be calculated by adding a torsion angle of a torsion bar in the torque sensor 10 to a motor rotation angle θm obtained from a rotation angle sensor 21 configured to detect a rotation angle of the rotation shaft of the motor 20.

In addition, a turning angle of the steered wheels 8L and 8R may be used in place of the steering angle θh. The turning angle may be detected by, for example, detecting a displacement amount of the rack 5*b*.

The ECU 30 includes, for example, a computer including a processor and peripheral components, such as a storage device. The processor may be, for example, a central processing unit (CPU) or a micro-processing unit (MPU).

The storage device may include any one of a semiconductor storage device, a magnetic storage device, and an optical storage device. The storage device may include registers, a cache memory, or a memory, such as a read only memory (ROM) and a random access memory (RAM), that is used as a main storage device.

Functions of the ECU 30, which will be described below, are achieved by, for example, the processor of the ECU 30 executing computer programs stored in the storage device.

Note that the ECU 30 may be formed by use of dedicated hardware for executing each type of information processing that will be described below.

For example, the ECU 30 may include functional logic circuits that are implemented in a general-purpose semiconductor integrated circuit. For example, the ECU 30 may have a programmable logic device (PLD), such as a field-programmable gate array (FPGA).

Figure 2:
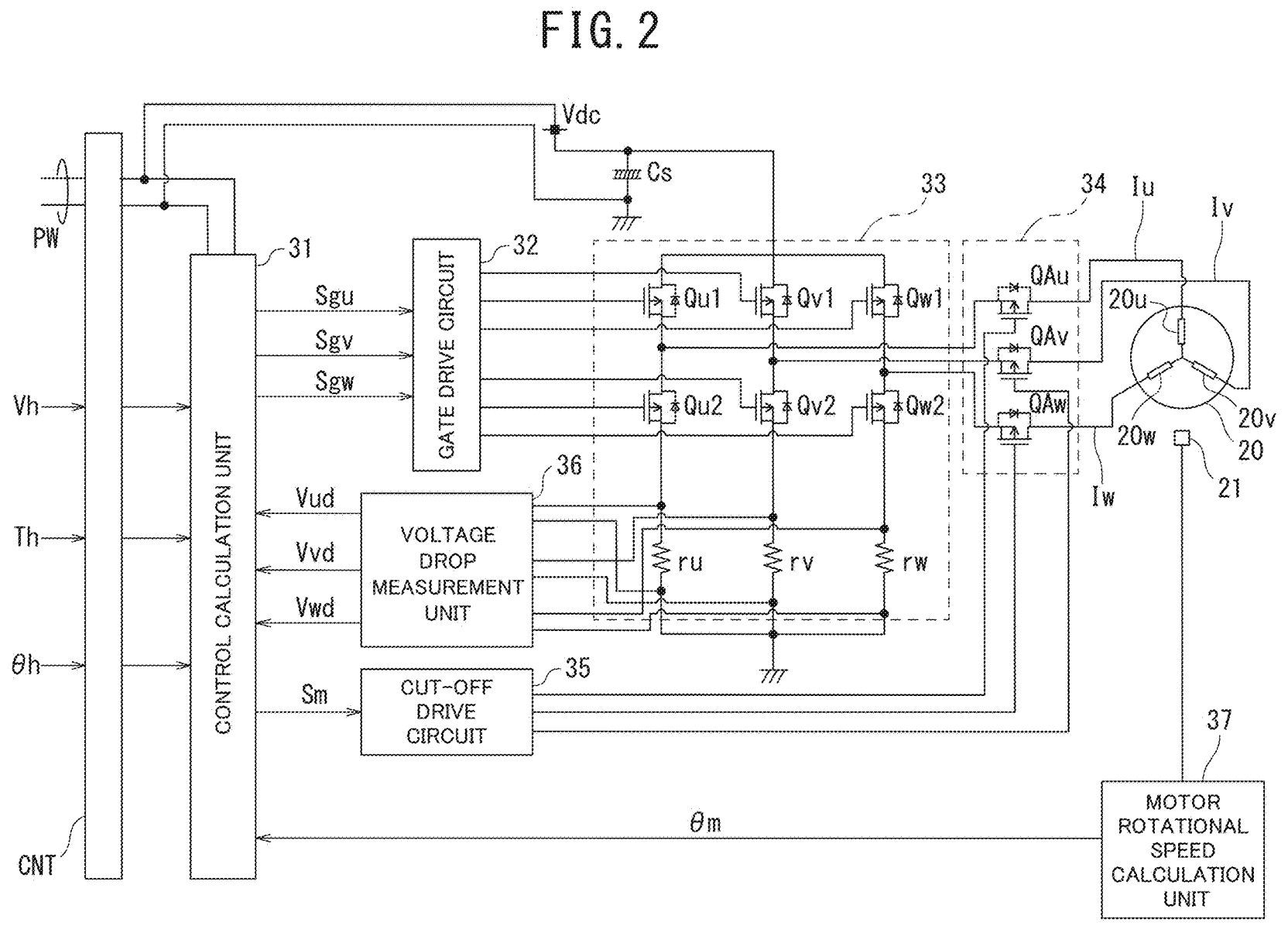

FIG. 2 is a configuration diagram illustrative of an outline of an example of the ECU 30 of the embodiment. The ECU 30 includes a control calculation unit 31, a gate drive circuit 32, a polyphase inverter 33, a current cut-off circuit 34, a cut-off drive circuit 35, a voltage drop measurement unit 36, and a motor rotational speed calculation unit 37. The control calculation unit 31 and the gate drive circuit 32 are examples of a "switching control unit" described in the claims.

To the ECU 30, a power wiring PW that transmits power from the battery 13 is connected via a connector CNT. To the control calculation unit 31, signals representing the steering torque Th detected by the torque sensor 10, the vehicle speed Vh detected by the vehicle speed sensor 12, and the steering angle θh detected by the steering angle sensor 14 are transmitted via the connector CNT.

The control calculation unit 31 calculates current command values that are control target values of driving currents of the motor 20, based on at least the steering torque Th. The control calculation unit 31 generates gate control signals Sgu, Sgv, and Sgw by calculating voltage command values obtained by performing compensation and the like on the current command values and by modulating the voltage command values using pulse width modulation (PWM). The gate control signals Sgu, Sgv, and Sgw are PWM signals that control drive voltages to be output from the polyphase inverter 33 to a U-phase coil 20u, a V-phase coil 20v, and a W-phase coil 20w of the motor 20.

The gate drive circuit 32 performs ON/OFF control of switching elements Qu1, Qv1, Qw1, Qu2, Qv2, and Qw2 in the polyphase inverter 33, which will be described later, based on the gate control signals Sgu, Sgv, and Sgw. For example, when the switching elements Qu1, Qv1, Qw1, Qu2, Qv2, and Qw2 are field effect transistors (FETs), the gate drive circuit 32 generates gate signals of the FETs, based on the gate control signals Sgu, Sgv, and Sgw.

The polyphase inverter 33 includes a three-phase bridge connected between a positive electrode-side line that is connected to a DC power source Vdc and that is supplied with DC power and a ground line.

The three-phase bridge includes switching element pairs in which the switching elements Qu1, Qv1, and Qw1 in upper-side arms of the U-phase, the V-phase, and the W-phase and the switching elements Qu2, Qv2, and Qw2 in lower-side arms of the U-phase, the V-phase, and the W-phase are connected in series to each other, respectively.

The U-phase current Iu supplied to the U-phase coil 20u of the motor 20 is supplied from a connection point between the switching elements Qu1 and Qu2, the V-phase current Iv supplied to the V-phase coil 20v is supplied from a connection point between the switching elements Qv1 and Qv2, and the W-phase current Iw supplied to the W-phase coil 20w is supplied from a connection point between the switching elements Qw1 and Qw2.

The U-phase current Iu, the V-phase current Iv, and the W-phase current Iw are flowed to the U-phase coil 20u, the V-phase coil 20v, and the W-phase coil 20w of the motor 20 via the current cut-off circuit 34, respectively.

The current cut-off circuit 34 includes three phase cut-off FETs QAu, QAv, and QAw to cut off the phase currents of the motor. The control calculation unit 31 outputs a control signal Sm for controlling conduction and cut-off of the current cut-off circuit 34 to the cut-off drive circuit 35. The cut-off drive circuit 35 outputs gate signals of the phase cut-off FETs QAu to QAw in accordance with the control signal Sm and thereby flows or cuts off the U-phase current Iu, the V-phase current Iv, and the W-phase current Iw from the polyphase inverter 33 to the motor 20, respectively.

To the polyphase inverter 33, a smoothing capacitor Cs is connected in parallel. The smoothing capacitor Cs may be, for example, an electrolytic capacitor. The ECU 30 may include a plurality of smoothing capacitors connected in parallel with one another, as the smoothing capacitor Cs.

Between the switching elements Qu2, Qv2, and Qw2 in the lower-side arms of the U-phase, the V-phase, and the W-phase and the ground line, shunt resistors ru, rv, and rw are connected in series, respectively.

The voltage drop measurement unit 36 measures voltage drops occurring across the shunt resistors ru, rv, and rw caused by currents flowing through the switching elements Qu2, Qv2, and Qw2 in the lower-side arms, respectively. The voltage drop measurement unit 36 outputs measured values Vud, Vvd, and Vwd of voltages across the shunt resistors ru, rv, and rw to the control calculation unit 31.

The motor rotational speed calculation unit 37 calculates a motor rotation angle θm (for example, a motor electrical angle) of the motor 20, based on a detection signal of the rotation angle sensor 21 and output the calculated motor rotation angle θm to the control calculation unit 31.

Figure 3:
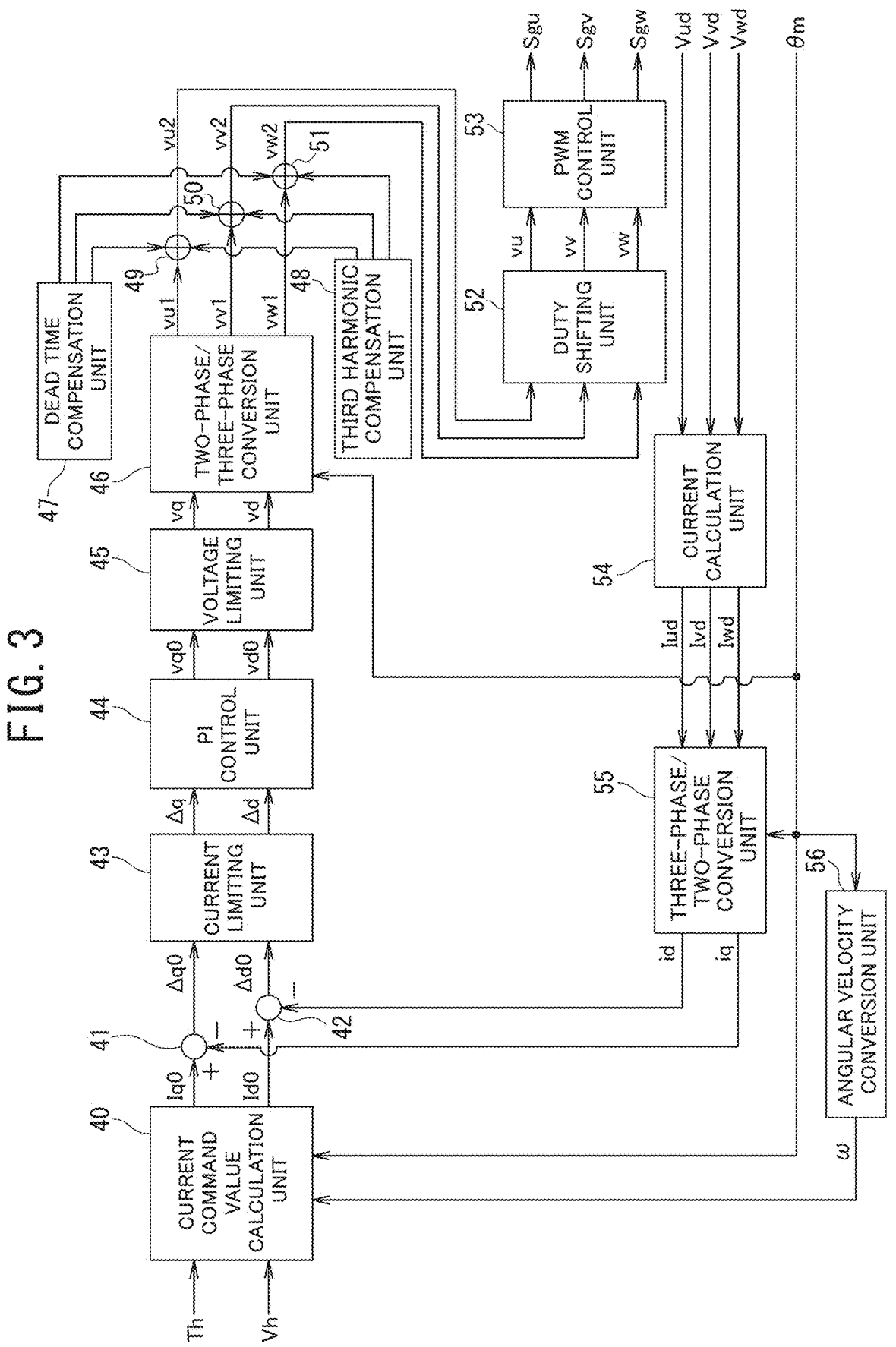
FIG. 3 is a block diagram of an example of a functional configuration of a control calculation unit.

FIG. 3 is a block diagram of an example of a functional configuration of the control calculation unit 31. The control calculation unit 31 includes a current command value calculation unit 40, subtracters 41 and 42, a current limiting unit 43, a proportional-integral (PI) control unit 44, a voltage limiting unit 45, a two-phase/three-phase conversion unit 46, a dead time compensation unit 47, a third harmonic compensation unit 48, adders 49 to 51, a duty shifting unit 52, a PWM control unit 53, a current calculation unit 54, a three-phase/two-phase conversion unit 55, and an angular velocity conversion unit 56 and drives the motor 20 by vector control.

The current command value calculation unit 40 calculates a q-axis current command value Iq0 and a d-axis current command value Id0 that are to be flowed through the motor 20, based on the steering torque Th, the vehicle speed Vh, the motor rotation angle θm of the motor 20, and rotational angular velocity ω of the motor 20.

On the other hand, the current calculation unit 54 calculates measured values Iud, Ivd, and Iwd of the U-phase current, the V-phase current, and the W-phase current of the motor 20, based on the measured values Vud, Vvd, and Vwd across the shunt resistors ru, rv, and rw, which are measured by the voltage drop measurement unit 36 in FIG. 2, respectively. The voltage drop measurement unit 36 and the current calculation unit 54 are an example of a "current measurement unit" described in the claims.

Note that in a phase of the U-phase, the V-phase, and the W-phase that has a highest duty ratio, it becomes difficult to accurately detect voltage across a shunt resistor since a period during which a switching element in the lower-side arm is turned on is short. Thus, the current calculation unit 54 may measure phase current of a phase having the highest duty ratio, based on voltages across the shunt resistors of the two phases other than the phase having the highest duty ratio and Kirchhoff's law (the sum of the U-phase current Iu, the V-phase current Iv, and the W-phase current Iw is 0).

For example, when the duty ratio of a phase having the highest duty ratio is less than or equal to a predetermined value, the current calculation unit 54 may measure phase current of the phase having the highest duty ratio, based on voltage across the shunt resistor of the phase having the highest duty ratio, and when the duty ratio of the phase having the highest duty ratio is greater than the predetermined value, the current calculation unit 54 may measure the phase current of the phase having the highest duty ratio, based on voltages across the shunt resistors of the other two phases and Kirchhoff's law.

The three-phase/two-phase conversion unit 55 converts the measured values Iud, Ivd, and Iwd of the U-phase current, the V-phase current, and the W-phase current to q-axis current iq and d-axis current id.

The subtracters 41 and 42, by subtracting the fed-back q-axis current iq and d-axis current id from the q-axis current command value Iq0 and the d-axis current command value Id0, calculates q-axis deviation current Δq0 and d-axis deviation current Δd0, respectively.

The current limiting unit 43 limits upper limits of the q-axis deviation current Δq0 and the d-axis deviation current Δd0. Limited q-axis deviation current Δq and limited d-axis deviation current Δd are input to the PI control unit 44.

The PI control unit 44 calculates a base q-axis voltage command value vq0 and a base d-axis voltage command value vd0 that bring the q-axis deviation current Δq and the d-axis deviation current Δd to 0, respectively.

For example, each of the base q-axis voltage command value vq0 and the base d-axis voltage command value vd0 may be a duty ratio that is a ratio of a voltage command value to power source voltage. For example, each of the base q-axis voltage command value vq0 and the base d-axis voltage command value vd0 may be a zero-centered duty ratio that varies within a range from −50% to +50% with 0% as a center value.

The voltage limiting unit 45 sets a q-axis voltage command value vq and a d-axis voltage command value vd by limiting the base q-axis voltage command value vq0 and the base d-axis voltage command value vd0, respectively. Details of a function of the voltage limiting unit 45 will be described later.

The two-phase/three-phase conversion unit 46 converts the q-axis voltage command value vq and the d-axis voltage command value vd to a first U-phase voltage command value vu1, a first V-phase voltage command value vv1, and a first W-phase voltage command value vw1.

The dead time compensation unit 47 outputs dead time compensation values that compensate for dead times of the polyphase inverter 33 to the adders 49 to 51.

The third harmonic compensation unit 48 generates third harmonic components for voltage utilization ratio improvement and outputs the generated third harmonic components to the adders 49 to 51. The third harmonic component is a harmonic component having a frequency three times a fundamental frequency that is a frequency of a base U-phase voltage command value vu0, a base V-phase voltage command value vv0, and base W-phase voltage command value vw0.

The adders 49 to 51 add the dead time compensation values and the third harmonic components to the first U-phase voltage command value vu1, the first V-phase voltage command value vv1, and the first W-phase voltage command value vw1 and thereby calculate a second U-phase voltage command value vu2, a second V-phase voltage command value vv2, and a second W-phase voltage command value vw2, respectively.

The duty shifting unit 52 sets a U-phase voltage command value vu, a V-phase voltage command value vv, and a W-phase voltage command value vw, based on the second U-phase voltage command value vu2, the second V-phase voltage command value vv2, and the second W-phase voltage command value vw2, respectively, when a maximum voltage command value among the second U-phase voltage command value vu2, the second V-phase voltage command value vv2, and the second W-phase voltage command value vw2 is less than or equal to a threshold value, and outputs the U-phase voltage command value vu, the V-phase voltage command value vv, and the W-phase voltage command value vw to the PWM control unit 53.

On the other hand, when the maximum voltage command value among the voltage command values vu2, vv2, and vw2 is greater than the threshold value, the duty shifting unit 52 correct to increase the U-phase voltage command value vu, the V-phase voltage command value vv, and the W-phase voltage command value vw and outputs the corrected U-phase voltage command value vu, the corrected V-phase voltage command value vv, and the corrected W-phase voltage command value vw to the PWM control unit 53.

Note that when the base q-axis voltage command value vq0 and the base d-axis voltage command value vd0, the first U-phase voltage command value vu1, the first V-phase voltage command value vv1, and the first W-phase voltage command value vw1, and the second U-phase voltage command value vu2, the second V-phase voltage command value vv2, and the second W-phase voltage command value vw2 are set as zero-centered duty ratios that vary within a range from −50% to +50% with 0% as a center value, the duty shifting unit 52 corrects the center points of the duty ratios and thereby outputs the U-phase voltage command value vu, the V-phase voltage command value vv, and the W-phase voltage command value vw as duty ratios that vary within a range from 0% to 100% with 50% as a center value. Details of a function of the duty shifting unit 52 will be described later.

The PWM control unit 53 generates the gate control signals Sgu, Sgv, and Sgw by modulating the U-phase voltage command value vu, the V-phase voltage command value vv, and the W-phase voltage command value vw using PWM and outputs the gate control signals Sgu, Sgv, and Sgw to the gate drive circuit 32 in FIG. 2.

The angular velocity conversion unit 56 calculates the rotational angular velocity ω of the motor 20, based on temporal change in the motor rotation angle θm. The motor rotation angle θm and the rotational angular velocity ω are input to the current command value calculation unit 40 and are used for the vector control.

Details of Duty Shifting Unit 52

Details of the duty shifting unit 52 will be described. First, a relationship between switching timing of the switching elements Qu1, Qv1, Qw1, Qu2, Qv2, and Qw2 of the polyphase inverter 33 and current measurement timing will be described.

In the following description, duty ratios of periods during which the switching elements Qu1, Qv1, and Qw1 in the upper-side arms of the U-phase, the V-phase, and the W-phase of the polyphase inverter 33 are in an ON state to a PWM period $T_{PWM}$ are denoted by "Du", "Dv", and "Dw", respectively.

In addition, target values of the duty ratios Du, Dv, and Dw specified by the second U-phase voltage command value vu2, the second V-phase voltage command value vv2, and the second W-phase voltage command value vw2 are referred to as "target duty ratios Dut, Dvt, and Dwt", respectively.

When the second U-phase voltage command value vu2, the second V-phase voltage command value vv2, and the second W-phase voltage command value vw2 are set as zero-centered duty ratios, correcting the center points of the duty ratios to 50% causes the second U-phase voltage command value vu2, the second V-phase voltage command value vv2, and the second W-phase voltage command value vw2 to be converted to values of the duty ratios of periods during which the switching elements in the upper-side arms are in the ON state to the PWM period $T_{PWM}$.

Among the U-phase, the V-phase, and the W-phase, a phase having the highest target duty ratio is sometimes referred to as "maximum-duty phase", a phase having a lowest target duty ratio is sometimes referred to as "minimum-duty phase", and a phase other than the maximum-duty phase and the minimum-duty phase is sometimes referred to as "intermediate-duty phase". The maximum-duty phase is an example of a "first phase" described in the claims, and the intermediate-duty phase and the minimum-duty phase are examples of a "second phase" described in the claims.

Figure 4:
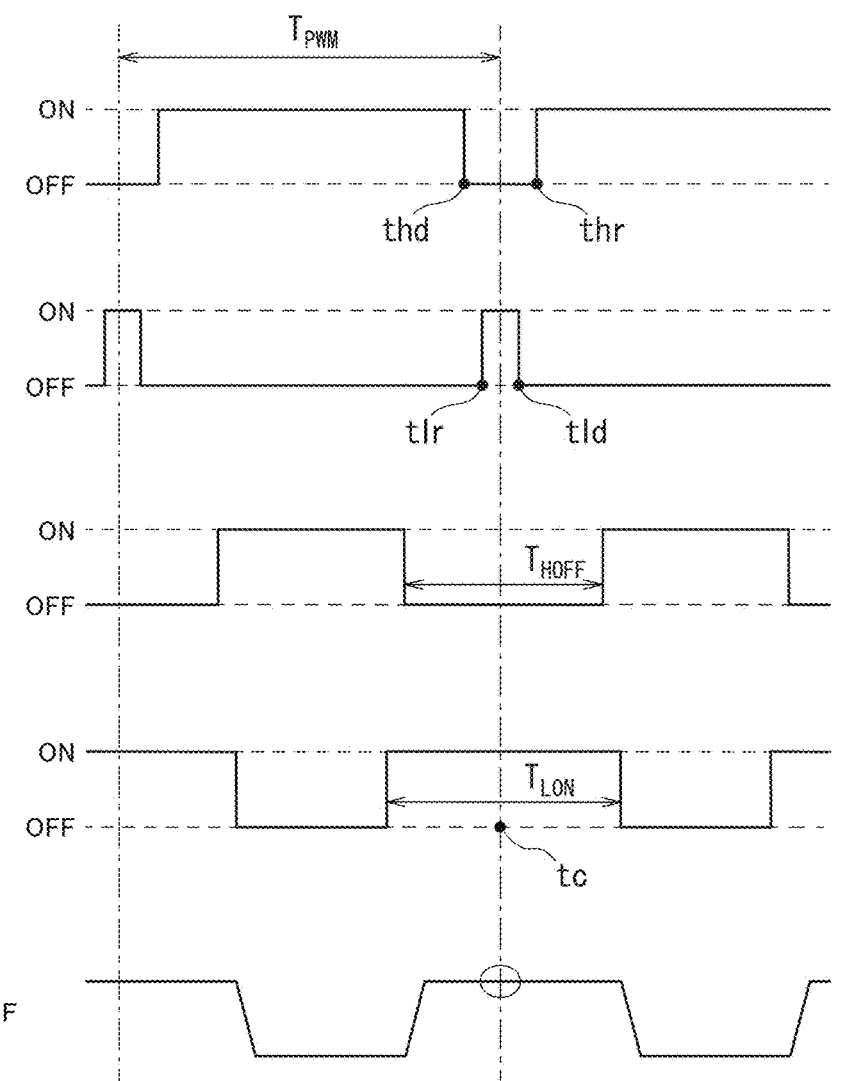
FIGS. 4(*a*) to 4(*e*) are schematic timing diagrams for a description of switching timing of switching elements and current measurement timing.

FIGS. 4(*a*) and 4(*b*) are schematic timing diagrams of PWM signals driving an upper-side arm switching element and a lower-side arm switching element of the maximum-duty phase, respectively, FIGS. 4(*c*) and 4(*d*) are schematic timing diagrams of PWM signals driving an upper-side arm switching element and a lower-side arm switching element of the intermediate-duty phase or the minimum-duty phase, respectively, and FIG. 4(*e*) is a schematic timing diagram of output voltage of an AD converter that samples voltage across the shunt resistor of the intermediate-duty phase or the minimum-duty phase.

A reference sign $T_{PWM}$ denotes a PWM period (that is, one period of the control period in the PWM control), a reference sign $T_{HOFF}$ denotes an OFF period during which the upper-side arm switching element is in an OFF state, and a reference sign $T_{LON}$ denotes an ON period during which the lower-side arm switching element is in the ON state. When the shunt resistors ru, rv, and rw are connected in series to the lower-side arm switching elements Qu2, Qv2, and Qw2 (in a case of a so-called "downstream shunt system"), the voltage drop measurement unit 36 samples voltages across the shunt resistors at a central time point tc of the ON period $T_{LON}$ of the lower-side arm switching element (or a central time point tc of the OFF period $T_{HOFF}$ of the upper-side arm switching element). A sampling period at which voltage across a shunt resistor is sampled may be, for example, a multiple of the PWM period $T_{PWM}$ ($n \times T_{PWM}$) (n denotes a natural number).

As a result, since as the duty ratio of the maximum-duty phase increases, switching timings thd, thr, tlr, and tld of the switching elements of the maximum-duty phase and the sampling timing tc of the voltages across the shunt resistors of the intermediate-duty phase and the minimum-duty phase come close to each other, there is a risk that switching noise is superimposed on measured values of the voltages across the shunt resistors and it becomes difficult to correctly detect the phase currents.

Thus, when the target duty ratio of the maximum-duty phase is greater than a predetermined first threshold value Dth1 that is set to less than 100%, the duty shifting unit 52 sets (shifts) the target duty ratio of the maximum-duty phase to 100%. That is, the duty shifting unit 52 corrects to increase the target duty ratio of the maximum-duty phase to 100%.

Because of this configuration, the switching elements of the maximum-duty phase are driven at a duty ratio of 100%. That is, the upper-side arm switching element and the lower-side arm switching element of the maximum-duty phase are driven with a ratio of a period during which the upper-side arm switching element of the maximum-duty phase is turned on to the PWM period $T_{PWM}$ set to 100% and a ratio of a period during which the lower-side arm switching element of the maximum-duty phase is turned on to the PWM period $T_{PWM}$ set to 0%, respectively.

FIGS. 5(*a*) to 5(*e*) are schematic timing diagrams for a description of switching timing of the switching elements and current measurement timing when the target duty ratio of the maximum-duty phase is shifted to 100%. FIGS. 5(*a*) and 5(*b*) are schematic timing diagrams of the PWM signals driving the upper-side arm switching element and the lower-side arm switching element of the maximum-duty phase, respectively, FIGS. 5(*c*) and 5(*d*) are schematic timing diagrams of the PWM signals driving the upper-side arm switching element and the lower-side arm switching element of the intermediate-duty phase or the minimum-duty phase, respectively, and FIG. 5(*e*) is a schematic timing diagram of the output voltage of the AD converter that samples the voltage across the shunt resistor of the intermediate-duty phase or the minimum-duty phase.

Since, as illustrated in FIGS. 5(*a*) and 5(*b*), shifting the target duty ratio of the maximum-duty phase to 100% prevents switching of the switching elements of the maximum-duty phase from occurring, switching noise is prevented from being superimposed on measured values of the voltages across the shunt resistors of the intermediate-duty phase and the minimum-duty phase. As a result, it becomes possible to correctly detect the phase currents of the intermediate-duty phase and the minimum-duty phase.

FIG. 6 is an explanatory diagram of a method for setting a duty ratio by the duty shifting unit 52. A dashed line D1*t* indicates the target duty ratio of the maximum-duty phase of the target duty ratios specified by the second U-phase voltage command value vu2, the second V-phase voltage command value vv2, and the second W-phase voltage command value vw2 that are input to the duty shifting unit 52. In addition, a dashed-dotted line D2*t* indicates the target duty ratio of the intermediate-duty phase or the minimum-duty phase.

In the example in FIG. 6, for the convenience of description, a case where the target duty ratio D1*t* of the maximum-duty phase is gradually increased to 100% with the lapse of time and the target duty ratio D2*t* of the intermediate-duty phase or the minimum-duty phase is fixed is illustrated.

On the other hand, a solid line D1 indicates the duty ratio of the maximum-duty phase of the duty ratios specified by the U-phase voltage command value vu, the V-phase voltage command value vv, and the W-phase voltage command value vw that the duty shifting unit 52 outputs. In addition, a dashed-two-dotted line D2 indicates the duty ratio of the intermediate-duty phase or the minimum-duty phase.

The duty shifting unit 52 determines whether or not the target duty ratio D1*t* of the maximum-duty phase is less than or equal to the first threshold value Dth1. When the target duty ratio D1*t* of the maximum-duty phase is less than or equal to the first threshold value Dth1, the duty shifting unit 52 does not correct to increase the target duty ratios D1*t* and D2*t*. That is, the target duty ratios D1*t* and D2*t* are set as duty ratios D1 and D2 without change, respectively.

As a result, the switching elements of the maximum-duty phase are driven at the target duty ratio D1*t*. In addition, the switching elements of the intermediate-duty phase and the minimum-duty phase are driven at the target duty ratio D2*t*.

In contrast, when the target duty ratio D1*t* of the maximum-duty phase is greater than the first threshold value Dth1, the duty shifting unit 52 corrects to increase the target duty ratio D1*t* to the duty ratio of 100%. In other words, the duty shifting unit 52 corrects the target duty ratio D1*t* to the duty ratio of 100% and outputs a corrected duty ratio D1=100% as a voltage command value of the maximum-duty phase. As a result, the switching elements of the maximum-duty phase are driven at the corrected duty ratio D1=100%.

Further, when the target duty ratio D1*t* of the maximum-duty phase is greater than the first threshold value Dth1, the duty shifting unit 52 outputs corrected duty ratio D2 that is obtained by correcting to increase the target duty ratio D2*t* of the intermediate-duty phase and the minimum-duty phase, as a voltage command value of the intermediate-duty phase and the minimum-duty phase. As a result, the switching elements of the intermediate-duty phase and the minimum-duty phase are driven at the corrected duty ratio D2.

For example, the duty shifting unit 52 calculates a duty difference $\Delta D=(100\%-D1t)$ obtained by subtracting the target duty ratio D1t of the maximum-duty phase from 100%, sets a sum obtained by adding the duty difference $\Delta D$ to the target duty ratio D2t of the intermediate-duty phase and the minimum-duty phase as the corrected duty ratio $D2=(D2t+\Delta D)$, and outputs the corrected duty ratio D2 as voltage command values of the intermediate-duty phase and the minimum-duty phase.

Because of this configuration, a correction amount $\Delta D$ by which the duty ratios of the intermediate-duty phase and the minimum-duty phase are to be corrected when the target duty ratio D1t is greater than the first threshold value Dth1 becomes a correction amount that becomes smaller as a difference obtained by subtracting the target duty ratio D1t of the maximum-duty phase from 100% is smaller (in other words, as an excess amount by which the target duty ratio D1t exceeds the first threshold value Dth1 is larger).

As described above, by correcting to increase the duty ratios of the intermediate-duty phase and the minimum-duty phase with the duty difference $\Delta D$ in association with shifting of the duty ratio of the maximum-duty phase to 100%, variation in the U-phase current Iu, the V-phase current Iv, and the W-phase current Iw due to shifting of the duty ratio can be suppressed or prevented. The reason for the advantageous effect will be described below.

Figure 7:
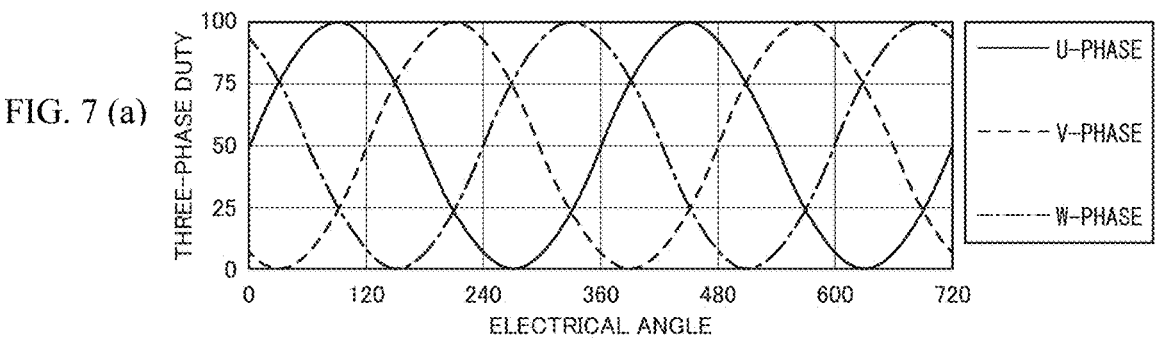
FIGS. 7(*a*) to 7(*d*) are explanatory diagrams of duty ratios of phases and differences in duty ratios between phases.
Figure 7:
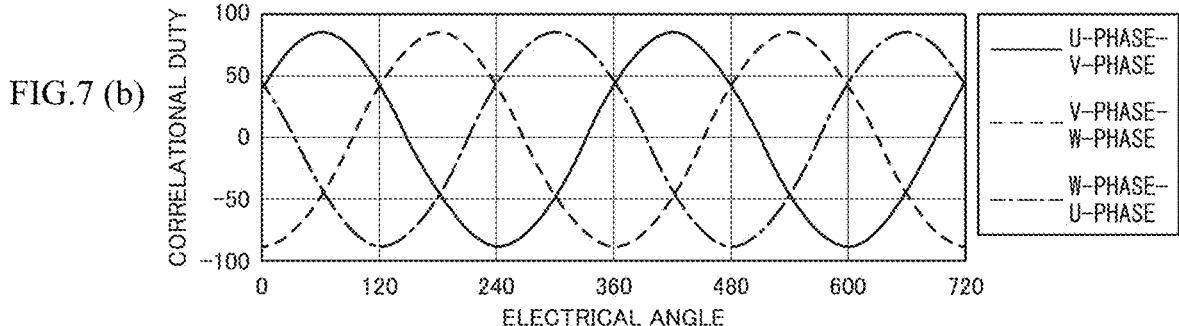
Figure 7:
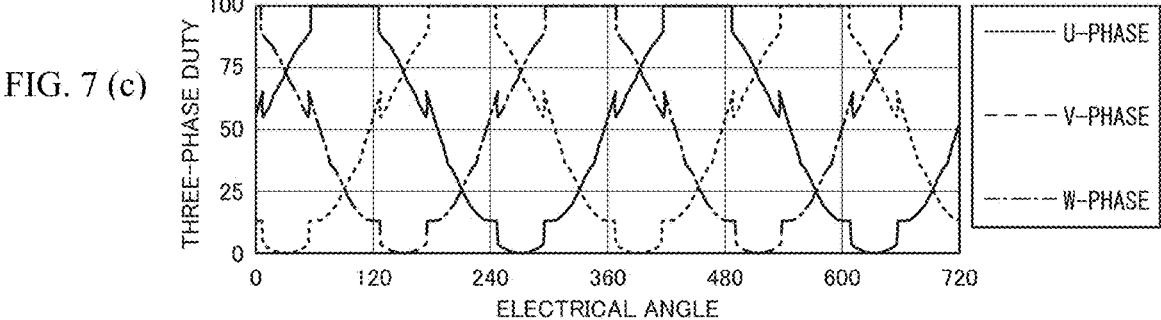
Figure 7:
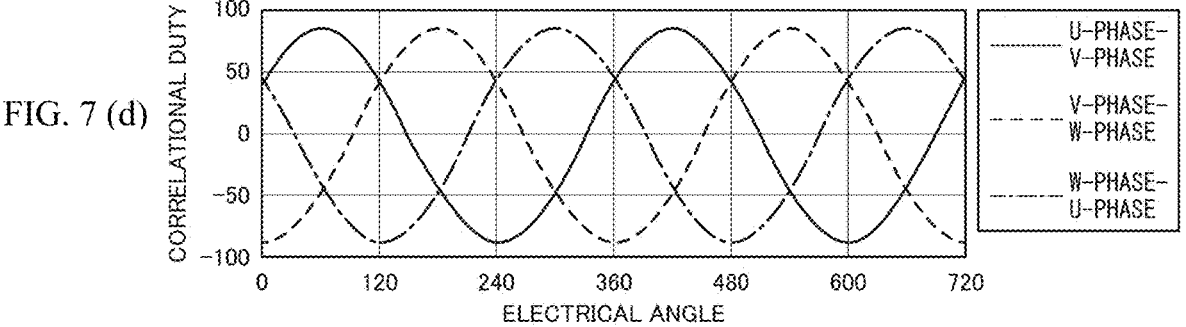

A solid line, a dashed line, and a dashed-dotted line in FIG. 7(a) indicate waveforms of the duty ratios Du, Dv, and Dw of the U-phase, the V-phase, and the W-phase when the duty ratios are not shifted, respectively. A solid line, a dashed line, and a dashed-dotted line in FIG. 7(b) indicate a correlational duty between the U-phase and the V-phase (that is, a difference Du−Dv between the duty ratios of the U-phase and the V-phase), a correlational duty between the V-phase and the W-phase (Dv−Dw), and a correlational duty between the W-phase and the U-phase (Dw−Du) when the duty ratios are not shifted, respectively.

On the other hand, a solid line, a dashed line, and a dashed-dotted line in FIG. 7(c) indicate waveforms of the duty ratios Du, Dv, and Dw of the U-phase, the V-phase, and the W-phase when the duty ratios are shifted, respectively. A solid line, a dashed line, and a dashed-dotted line in FIG. 7(d) indicate a correlational duty between the U-phase and the V-phase (Du−Dv), a correlational duty between the V-phase and the W-phase (Dv−Dw), and a correlational duty between the W-phase and the U-phase (Dw−Du) when the duty ratios are shifted, respectively. For the convenience of description, in FIGS. 7(a) and 7(b), waveforms when dead time compensation values and third harmonic components are omitted are illustrated, and in FIGS. 7(c) and 7(d), waveforms when third harmonic components are omitted are illustrated.

As evident from FIGS. 7(a) and 7(c), shifting the duty ratios causes the waveforms themselves of the duty ratios Du, Dv, and Dw of the U-phase, the V-phase, and the W-phase to be changed. However, by correcting to increase the duty ratio of the intermediate-duty phase or the minimum-duty phase with the duty difference $\Delta D$ in association with shifting of the duty ratio of the maximum-duty phase to 100%, differences in the duty ratio between the phases do not change even when the duty ratios are shifted, as illustrated in FIGS. 7(b) and 7(d).

As described above, since by correcting to increase the duty ratios of the intermediate-duty phase and the minimum-duty phase in association with shifting of the duty ratio of the maximum-duty phase to 100%, changes in potential differences between terminals of the motor 20 are suppressed or prevented even when the duty ratios are shifted, variation in the U-phase current Iu, the V-phase current Iv, and the W-phase current Iw can be suppressed or prevented.

Figure 8:
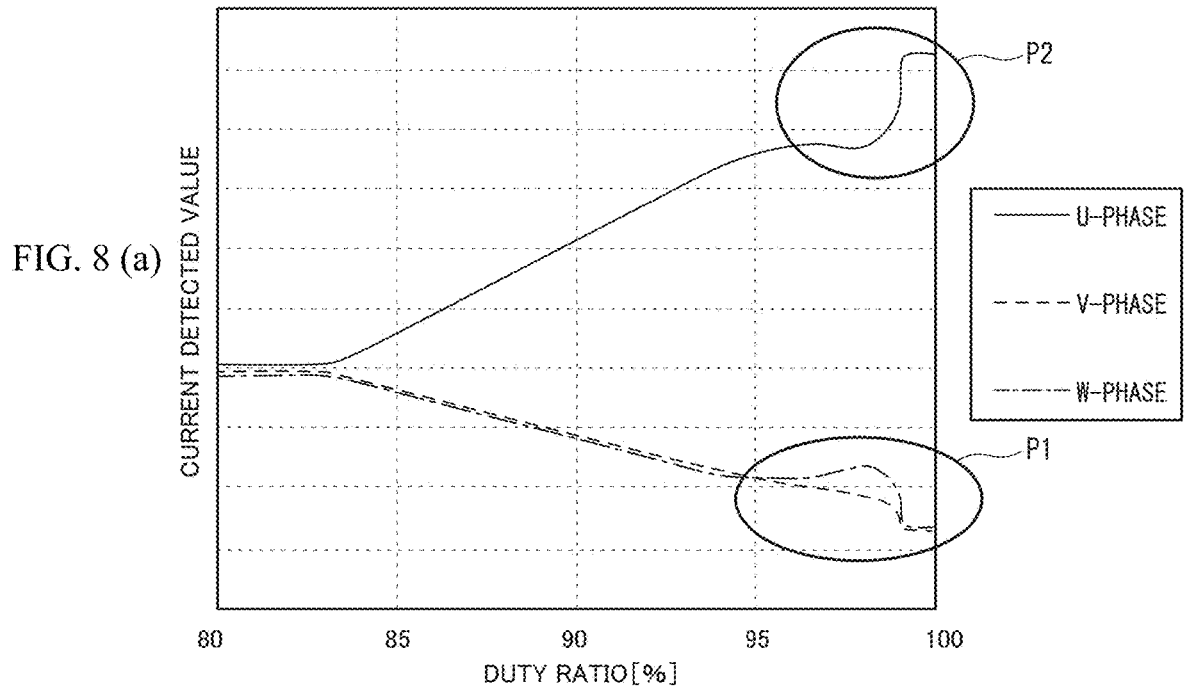
FIGS. 8(*a*) and 8(*b*) are explanatory diagrams of advantageous effects of the embodiment.
Figure 8:
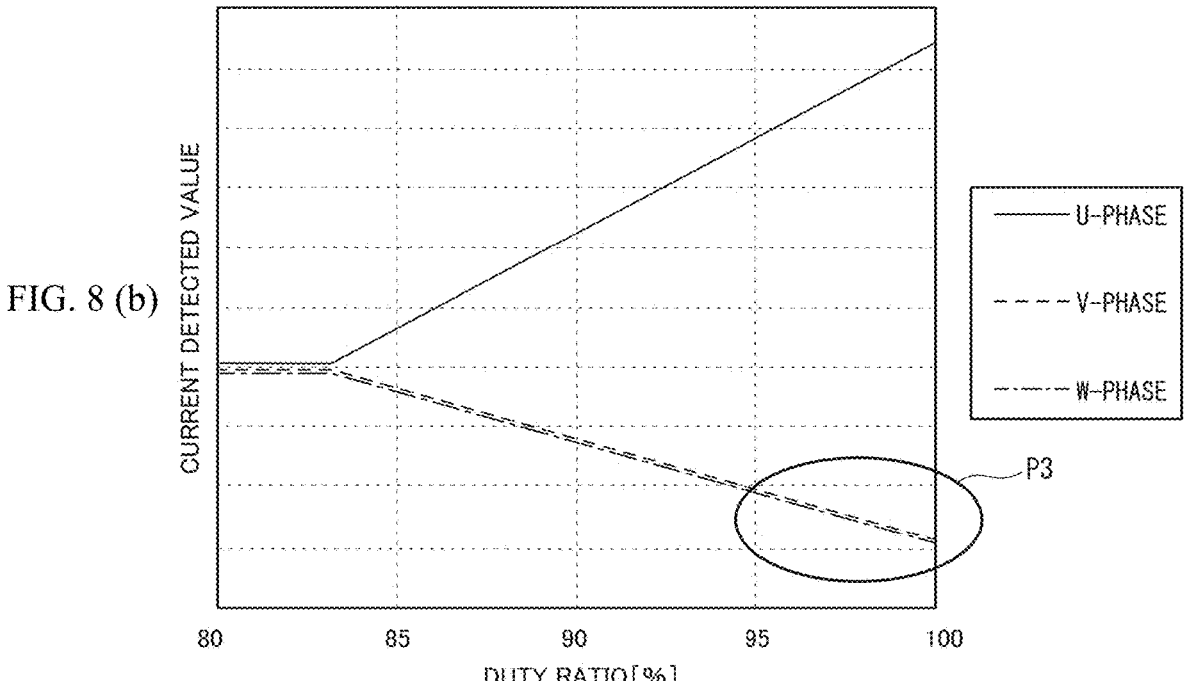

Next, advantageous effects of the embodiment will be described. FIGS. 8(a) and 8(b) illustrate a measured value Iud of the U-phase current (solid line), a measured value Ivd of the V-phase current (dashed line), and a measured value Iwd of the W-phase current (dashed-dotted line) when the duty ratio Du of the U-phase that is the maximum-duty phase gradually increases from 80% to 100%. FIG. 8(a) illustrates the measured values when the duty ratios are not shifted, and FIG. 8(b) illustrates the measured values when the duty ratios are shifted. For the convenience of description, the duty ratios Dv and Dw of the V-phase and the W-phase are fixed at 80%.

When the duty ratios are not shifted (FIG. 8(a)), as the duty ratio Du of the U-phase that is the maximum-duty phase comes close to 100%, it becomes difficult to correctly detect the V-phase current Ivd and the W-phase current Iwd due to influence of switching noise caused by switching of the upper-side arm switching element Qu1 of the U-phase, as illustrated by a part indicated by an ellipse P1. Since the U-phase current Iud is calculated from the V-phase current Ivd and the W-phase current Iwd, using Kirchhoff's law, when it becomes difficult to correctly detect the V-phase current Ivd and the W-phase current Iwd, it becomes difficult to correctly detect the U-phase current Iud, as illustrated by a part indicated by an ellipse P2.

In contrast, when the duty ratios are shifted (FIG. 8(b)), it is possible to correctly detect the V-phase current Ivd and the W-phase current Iwd even when the duty ratio Du of the U-phase comes close to 100%, as illustrated by a part indicated by an ellipse P3. As a result, it also becomes possible to correctly detect the U-phase current Iud.

Details of Voltage Limiting Unit 45

Details of the voltage limiting unit 45 in FIG. 3 will be described. When the duty shifting unit 52 correcting to increase the target duty ratio D2t of the intermediate-duty phase when the target duty ratio of the maximum-duty phase is greater than the first threshold value Dth1 causes the corrected duty ratio D2 to become large, a period during which a switching element in the lower-side arm of the intermediate-duty phase is turned on sometimes becomes excessively short. As a result, it sometimes becomes difficult to correctly detect voltage across the shunt resistor in the intermediate-duty phase. Note that the intermediate-duty phase is an example of a "phase having the second highest target duty ratio" described in the claims.

Figure 9:
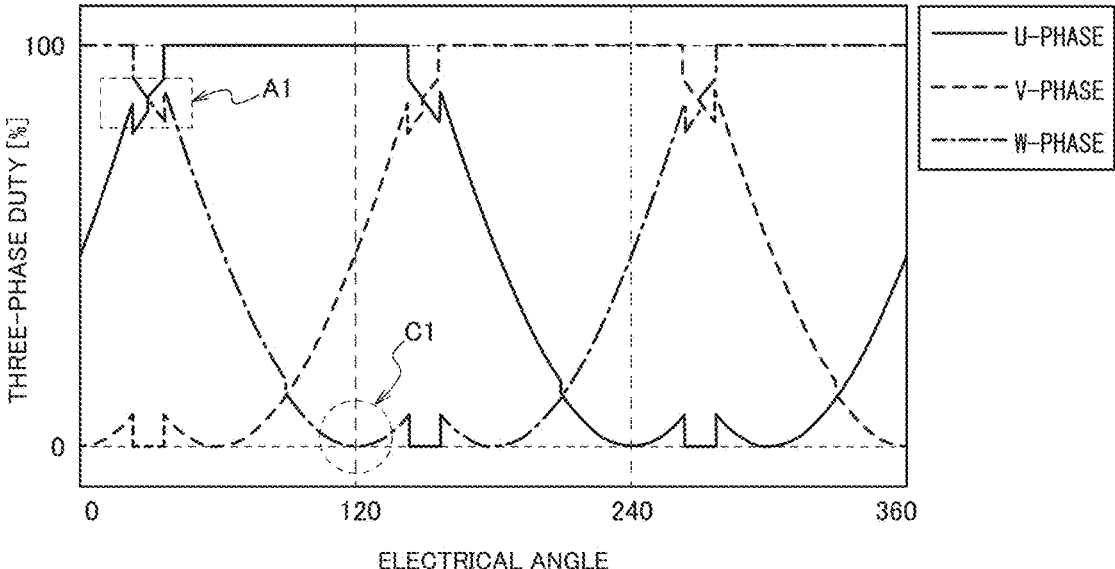
FIGS. 9(*a*) and 9(*b*) are explanatory diagrams of the duty ratios of the phases when a q-axis voltage command value and a d-axis voltage command value are not limited.
Figure 9:
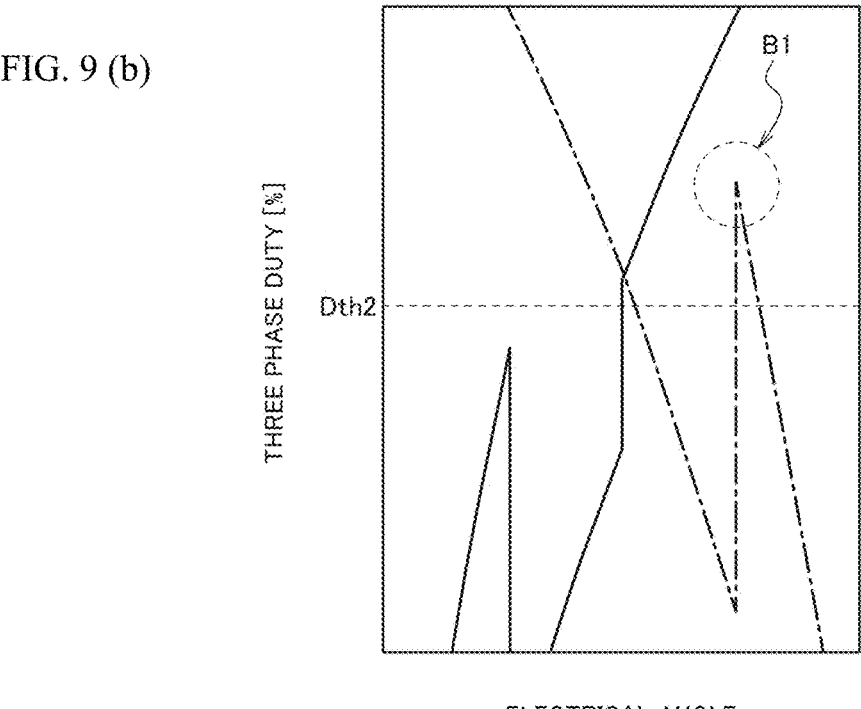

FIG. 9(a) illustrates the duty ratios Du, Dv, and Dw of the U-phase, the V-phase, and the W-phase (that is, the U-phase voltage command value vu, the V-phase voltage command value vv, and the W-phase voltage command value vw) when the target duty ratio of the maximum-duty phase is greater than the first threshold value Dth1. FIG. 9(b) illustrates an enlarged view of a part indicated by an arrow A1 in FIG. 9(a).

A second threshold value Dth2 in FIG. 9(b) is a predetermined threshold value (current detection marginal threshold value) of a duty ratio that allows voltage across a shunt resistor to be correctly detected. The second threshold value Dth2 is set to a value less than 100%. When the duty ratio exceeds the second threshold value Dth2, there is a risk that a period during which a switching element in the lower-side arm is turned on becomes excessively short and it becomes difficult to accurately detect voltage across a shunt resistor.

For example, the second threshold value Dth2 may be set according to a stabilization time that is a time after switching of a switching element in the lower-side arm is performed until the measured value of voltage across the shunt resistor measured by the voltage drop measurement unit 36 stabilizes.

For example, the second threshold value Dth2 may be set in such a manner that length of a period during which a switching element in the lower-side arm of the intermediate-duty phase is in the ON state is not less than the above-described stabilization time.

For example, the second threshold value Dth2 may be set to a value smaller than the first threshold value Dth1.

Referring to FIG. 9(b), the duty ratio Dw of the W-phase that is the intermediate-duty phase (that is, the W-phase voltage command value vw) exceeds the second threshold value Dth2, in a part indicated by an arrow B1. For example, a dead time compensation value being added to the voltage command value facilitates the duty ratio of the intermediate-duty phase exceeding the second threshold value Dth2.

Thus, the voltage limiting unit 45 sets the q-axis voltage command value vq and the d-axis voltage command value vd by limiting the base q-axis voltage command value vq0 and the base d-axis voltage command value vd0, respectively, in such a way that when the target duty ratio of the maximum-duty phase is greater than the first threshold value Dth1, the duty ratio D2 of the intermediate-duty phase does not exceed the second threshold value Dth2.

For example, the voltage limiting unit 45 may calculate, based on the magnitude of a voltage vector of the base q-axis voltage command value vq0 and the base d-axis voltage command value vd0

[Math. 1]

$$\sqrt{vq0^2 + vd0^2},$$

a limiting gain $G_{duty}$ that is expressed by the following formula (1).

[Math. 2]

$$G_{duty} = \frac{2}{\sqrt{3}} \times \frac{D_{Ltd} - 2 \times C_{DT}}{\sqrt{vq0^2 + vd0^2}} \quad (1)$$

The constant $D_{Ltd}$ in the above formula (1) is a limited duty value that is set to a value less than 100%. The limited duty value $D_{Ltd}$ is appropriately set in such a way that when the target duty ratio of the maximum-duty phase is greater than the first threshold value Dth1, the duty ratio D2 of the intermediate-duty phase does not exceed the second threshold value Dth2.

In addition, the constant $C_{DT}$ is a dead time compensation value to be added to the voltage command value by the dead time compensation unit 47. As the dead time compensation value $C_{DT}$, for example, a division result obtained by dividing the PWM period $T_{PWM}$ by a dead time ($C_{DT}=T_{PWM}/$ (dead time)) may be used. Note that since in many cases, there is a gap between a design value and an actual value for the dead time, an appropriately set value may be used as the dead time compensation value $C_{DT}$.

In addition, the constant $2/\sqrt{3}$ is a coefficient matching an inverse of a rate of decrease in amplitude of the three-phase voltage command value due to superimposition of a third harmonic component ((amplitude before compensation)/ (amplitude after compensation)). When no third harmonic component is superimposed on the three-phase voltage command value, the coefficient $2/\sqrt{3}$ may be omitted.

The voltage limiting unit 45 determines whether or not the limiting gain $G_{duty}$ is greater than or equal to "1" (that is, whether or not the gain is greater than or equal to 100%). When the limiting gain $G_{duty}$ is greater than or equal to "1", the voltage limiting unit 45 outputs the base q-axis voltage command value vq0 and the base d-axis voltage command value vd0 as it is as the q-axis voltage command value vq and the d-axis voltage command value vd without limitation, respectively.

In contrast, when the limiting gain $G_{duty}$ is less than "1", the voltage limiting unit 45 outputs products obtained by multiplying the base q-axis voltage command value vq0 and the base d-axis voltage command value vd0 by a gain $G_{duty}/2$ as the q-axis voltage command value vq=$(G_{duty}/2) \times$vq0 and the d-axis voltage command value vd=$(G_{duty}/2) \times$vd0.

Figure 10:
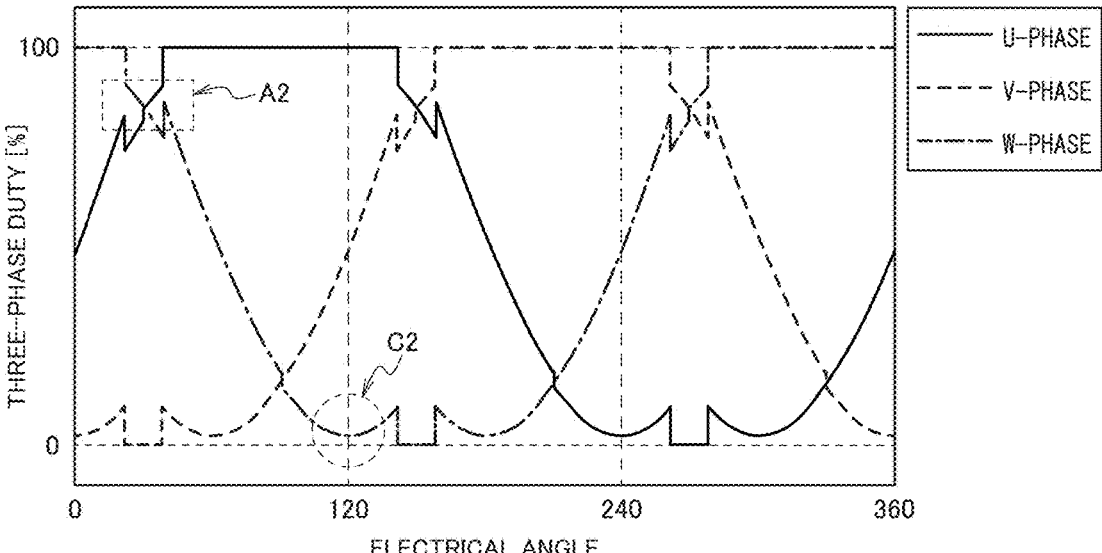
FIGS. 10(*a*) and 10(*b*) are explanatory diagrams of the duty ratios of the phases when the q-axis voltage command value and the d-axis voltage command value are limited.
Figure 10:
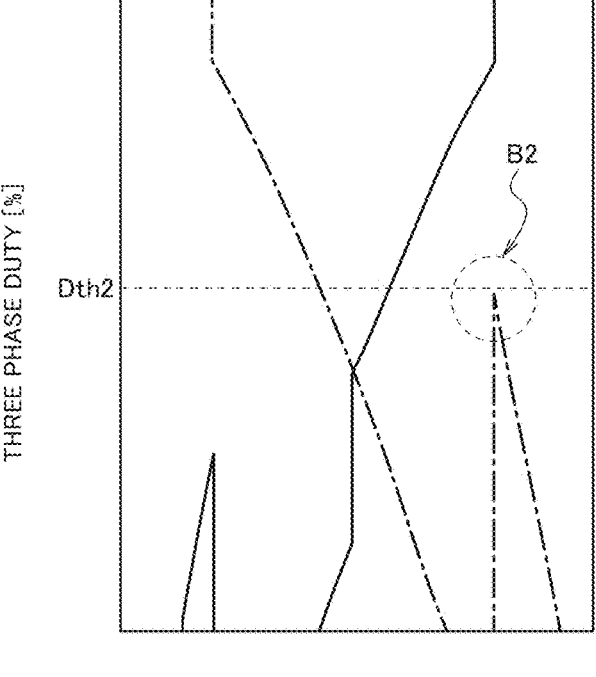

FIG. 10(a) illustrates the duty ratios Du, Dv, and Dw of the U-phase, the V-phase, and the W-phase (that is, the U-phase voltage command value vu, the V-phase voltage command value vv, and the W-phase voltage command value vw) when the base q-axis voltage command value vq0 and the base d-axis voltage command value vd0 are limited. FIG. 10(b) illustrates an enlarged view of a part indicated by an arrow A2 in FIG. 10(a).

In a part indicated by an arrow B2, the duty ratio Dw of the W-phase that is the intermediate-duty phase (that is, the W-phase voltage command value vw) is limited to less than or equal to the second threshold value Dth2. Thus, it is possible to prevent a situation in which a period during which a switching element in the lower-side arm of the intermediate-duty phase is turned on becomes excessively short and it becomes difficult to accurately detect voltage across the shunt resistor rw from occurring.

Further, attention will be directed to a part indicated by an arrow C1 in FIG. 9(a). In the part indicated by the arrow C1, a third harmonic component being superimposed causes the duty ratio Dw of the W-phase that is the minimum-duty phase (that is, the W-phase voltage command value vw) to come close to "0". There is a risk that a problem occurs in that when the duty ratio has a value in the vicinity of "0", a period during which a switching element in the upper-side arm is turned on becomes excessively short and current is prevented from flowing through the switching element in the upper-side arm even when the duty ratio is slightly larger than "0".

In contrast, referring to a part indicated by an arrow C2 in FIG. 10(a), by limiting the base q-axis voltage command value vq0 and the base d-axis voltage command value vd0, the duty ratio of the minimum-duty phase can be prevented from being set to a value in the vicinity of "0". Thus, a problem in that current is prevented from flowing through the switching element in the upper-side arm even when the duty ratio is slightly larger than "0" can be avoided from occurring.

Operation

Figure 11:
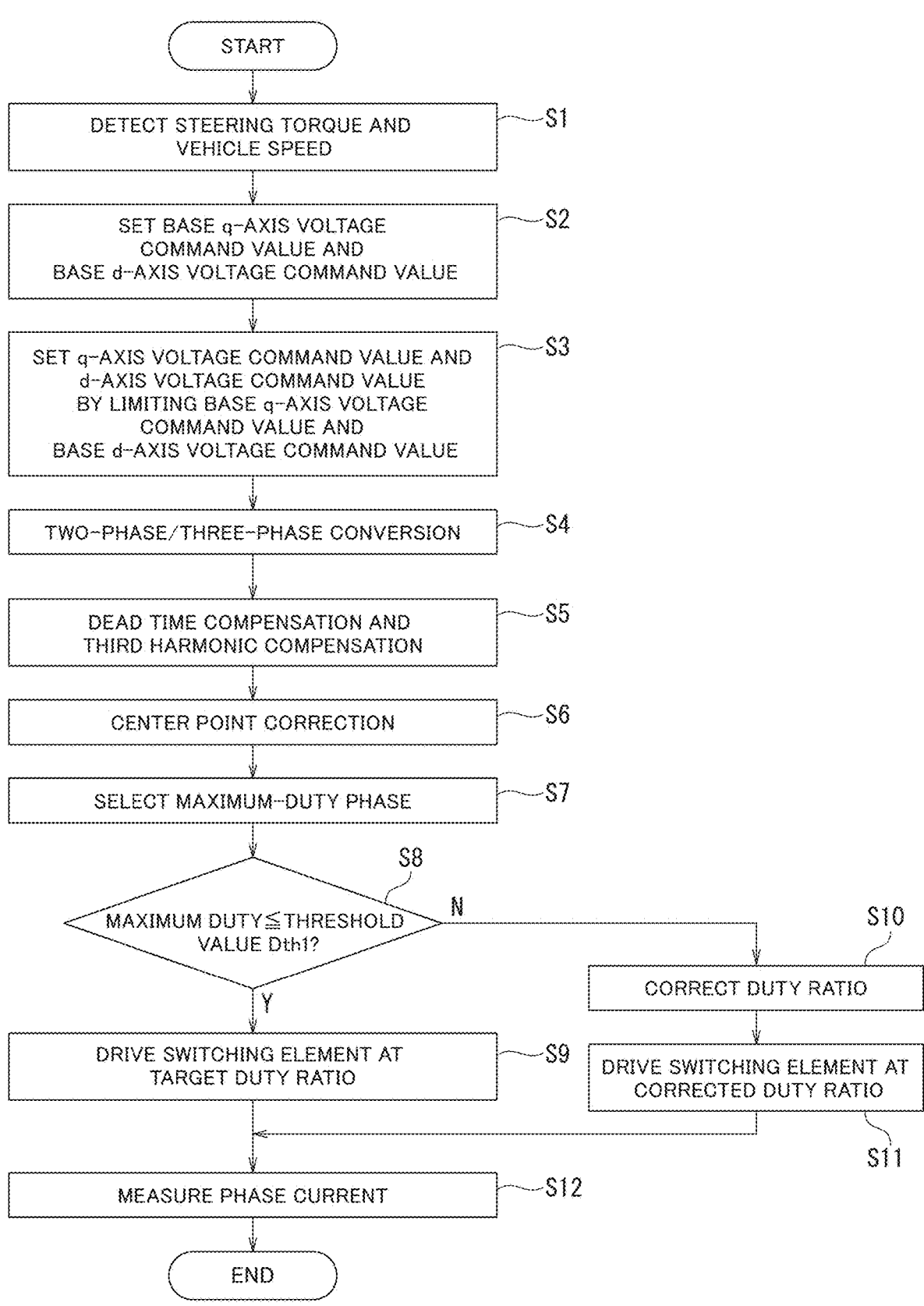
FIG. 11 is a flowchart of an example of a current measurement method of the embodiment.

FIG. 11 is a flowchart of an example of a current measurement method of the embodiment.

In step S1, the torque sensor 10 and the vehicle speed sensor 12 detect steering torque Th of the steering shaft 2 and vehicle speed Vh.

In step S2, the current command value calculation unit 40 calculates a q-axis current command value Iq0 and a d-axis current command value Id0, based on the steering torque Th and the vehicle speed Vh. The PI control unit 44 calculates a base q-axis voltage command value vq0 and a base d-axis voltage command value vd0, based on current deviations of q-axis current iq and d-axis current id with respect to the q-axis current command value Iq0 and the d-axis current command value Id0, respectively. The PI control unit 44 calculates, as the base q-axis voltage command value vq0 and the base d-axis voltage command value vd0, zero-centered duty ratios that vary within a range from −50% to +50% with 0% as a center value.

In step S3, the voltage limiting unit 45 sets a q-axis voltage command value vq and a d-axis voltage command value vd by limiting the base q-axis voltage command value vq0 and the base d-axis voltage command value vd0, respectively. Specifically, the voltage limiting unit 45 calculates a limiting gain $G_{duty}$ expressed by the above formula (1), and when the limiting gain $G_{duty}$ is greater than or equal to "1", the voltage limiting unit 45 outputs the base q-axis voltage command value vq0 and the base d-axis voltage command value vd0 as it is as the q-axis voltage command value vq and the d-axis voltage command value vd without limitation, respectively.

In contrast, when the limiting gain $G_{duty}$ is less than "1", the voltage limiting unit 45 outputs products obtained by multiplying the base q-axis voltage command value vq0 and the base d-axis voltage command value vd0 by a gain $G_{duty}/2$ as the q-axis voltage command value vq=($G_{duty}/2$)×vq0 and the d-axis voltage command value vd=($G_{duty}/2$)×vd0.

In step S4, the two-phase/three-phase conversion unit 46 converts the q-axis voltage command value vq and the d-axis voltage command value vd to a first U-phase voltage command value vu1, a first V-phase voltage command value vv1, and a first W-phase voltage command value vw1.

In step S5, the adders 49 to 51 add the dead time compensation values and the third harmonic components to the first U-phase voltage command value vu1, the first V-phase voltage command value vv1, and the first W-phase voltage command value vw1 and thereby calculate a second U-phase voltage command value vu2, a second V-phase voltage command value vv2, and a second W-phase voltage command value vw2, respectively.

In step S6, the duty shifting unit 52, by correcting center points of the duty ratios of the second U-phase voltage command value vu2, the second V-phase voltage command value vv2, and the second W-phase voltage command value vw2, converts the duty ratios to duty ratios that vary within a range from 0% to 100% with 50% as a center value.

In step S7, the duty shifting unit 52 selects a maximum-duty phase.

In step S8, the duty shifting unit 52 determines whether or not the target duty ratio D1t of the maximum-duty phase is less than or equal to the first threshold value Dth1. When the target duty ratio D1t is less than or equal to the first threshold value Dth1 (step S8: Y), the process proceeds to step S9. When the target duty ratio D1t is not less than or equal to the first threshold value Dth1 (step S8: N), the process proceeds to step S10.

In step S9, the duty shifting unit 52 outputs the second U-phase voltage command value vu2, the second V-phase 65 voltage command value vv2, and the second W-phase voltage command value vw2, the center points of which are corrected in step S6, as a U-phase voltage command value vu, a V-phase voltage command value vv, and a W-phase voltage command value vw, respectively. Because of this processing, the switching elements of the maximum-duty phase are driven at the target duty ratio D1t. In addition, the switching elements of the intermediate-duty phase and the minimum-duty phase are driven at the target duty ratio D2t. Subsequently, the process proceeds to step S12.

In step S10, the duty shifting unit 52 corrects the duty ratio of the maximum-duty phase to 100% by shifting the target duty ratio D1t to a duty ratio of 100%. In addition, the duty shifting unit 52 corrects the duty ratios of the intermediate-duty phase and the minimum-duty phase to a sum (D2t+ΔD) obtained by adding a duty difference ΔD=(100%−D1t) to the target duty ratio D2t.

In step S11, the duty shifting unit 52 outputs corrected duty ratios corrected in step S10 as a U-phase voltage command value vu, a V-phase voltage command value vv, and a W-phase voltage command value vw. Through this processing, the switching elements of the maximum-duty phase, the intermediate-duty phase, and the minimum-duty phase are driven at the corrected duty ratios corrected in step S10. Subsequently, the process proceeds to step S12.

In step S12, the voltage drop measurement unit 36 and the current calculation unit 54 measure the U-phase current Iu, the V-phase current Iv, and the W-phase current Iw. For example, the current calculation unit 54 may measure phase currents of the intermediate-duty phase and the minimum-duty phase, based on voltages across the shunt resistors of the intermediate-duty phase and the minimum-duty phase, respectively and measure phase current of the maximum-duty phase, based on the phase currents of the intermediate-duty phase and the minimum-duty phase and Kirchhoff's law. Subsequently, the process terminates.

Variations (1) In the above-described embodiment, a case where the shunt resistors ru, rv, and rw are connected in series to the lower-side arm switching elements Qu2, Qv2, and Qw2, respectively (in a case of a so-called "downstream shunt system") is described. In this case, the upper-side arm switching elements Qu1, Qv1, and Qw1 are examples of a "first switching element" described in the claims, and the lower-side arm switching elements Qu2, Qv2, and Qw2 are examples of a "second switching element" described in the claims.

However, the present invention is not limited to the downstream shunt system and is also applicable to a configuration in which the shunt resistors are connected in series to the upper-side arm switching elements Qu1, Qv1, and Qw1 (in a case of a so-called "upstream shunt system").

In this case, the upper-side arm switching elements Qu1, Qv1, and Qw1 are examples of the "second switching element" described in the claims, and the lower-side arm switching elements Qu2, Qv2, and Qw2 are examples of the "first switching element" described in the claims.

In this case, the above-described minimum-duty phase (that is, a phase having the lowest target duty ratio) is a phase where a ratio of a period during which the lower-side arm switching element (first switching element) is turned on to the PWM period $T_{PWM}$ is largest. Hereinafter, a ratio of a period during which a lower-side arm switching element is turned on to the PWM period $T_{PWM}$ is sometimes referred to as "lower-side duty ratio".

When the target duty ratio of the minimum-duty phase is less than a predetermined threshold value that is set to a value greater than 0%, the duty shifting unit 52 shifts the duty ratio of the minimum-duty phase to 0%. Because of this configuration, when a target value of the lower-side duty ratio of the minimum-duty phase is greater than a first threshold value that is set to less than 100%, the duty shifting unit 52 shifts a target value of the lower-side duty ratio to 100%. In addition, the gate drive circuit 32 corrects to decrease the duty ratios of the intermediate-duty phase and the maximum-duty phase in association with shifting of the duty ratio of the minimum-duty phase to 0%.

(2) Although, in the foregoing description, an example in which the electric power conversion device of the present invention is applied to an electric power steering device using a column assist system that is referred to as a so-called upstream assist system was described, the electric power conversion device of the present invention may be applied to an electric power steering device using a so-called downstream assist system. Hereinafter, as an example of the electric power steering device using the downstream assist system, configuration examples in which the electric power conversion device of the present invention is applied to electric power steering devices using a single pinion assist system, a rack assist system, and a dual pinion assist system will be described.

Figure 12:
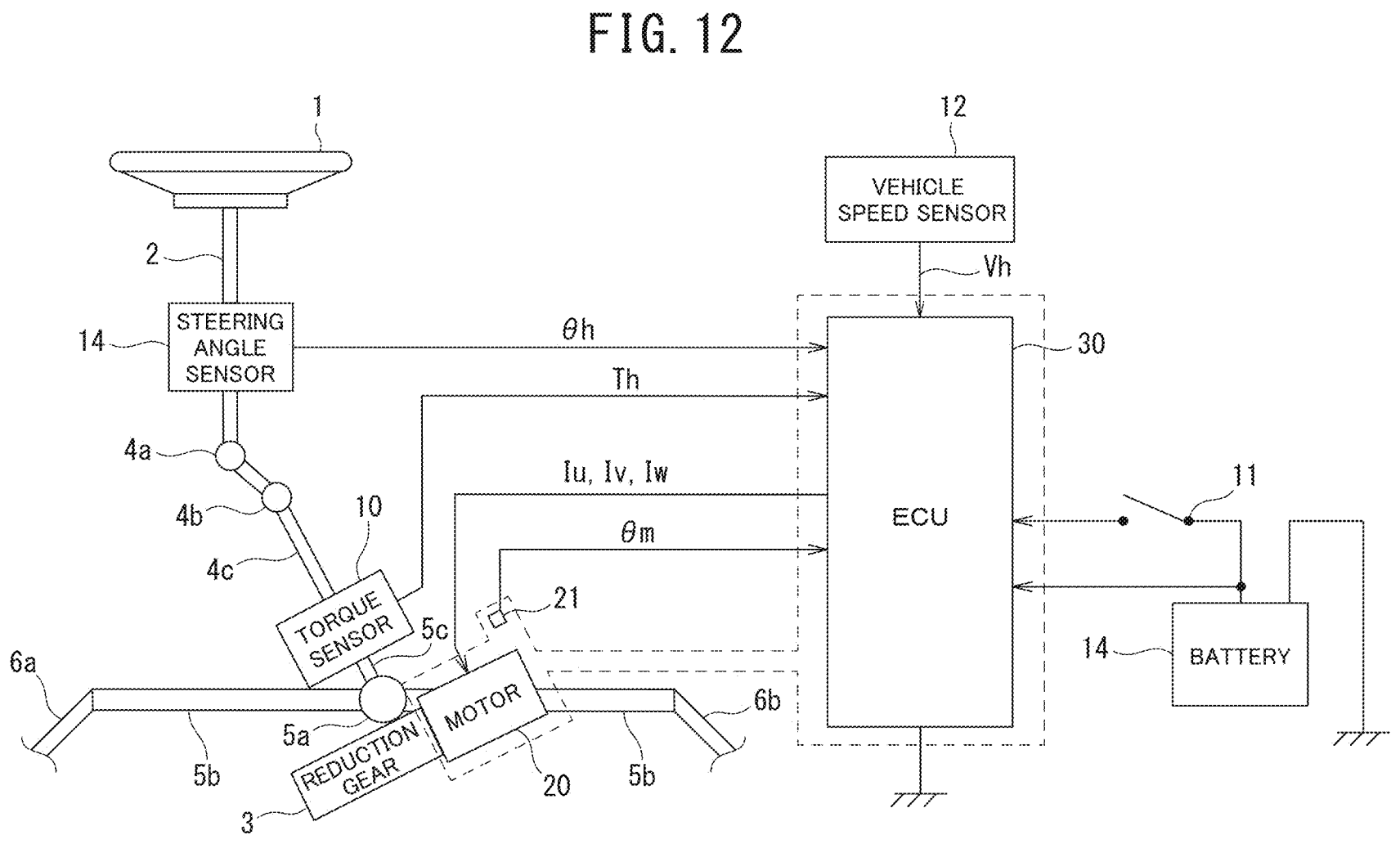
Figure 13:
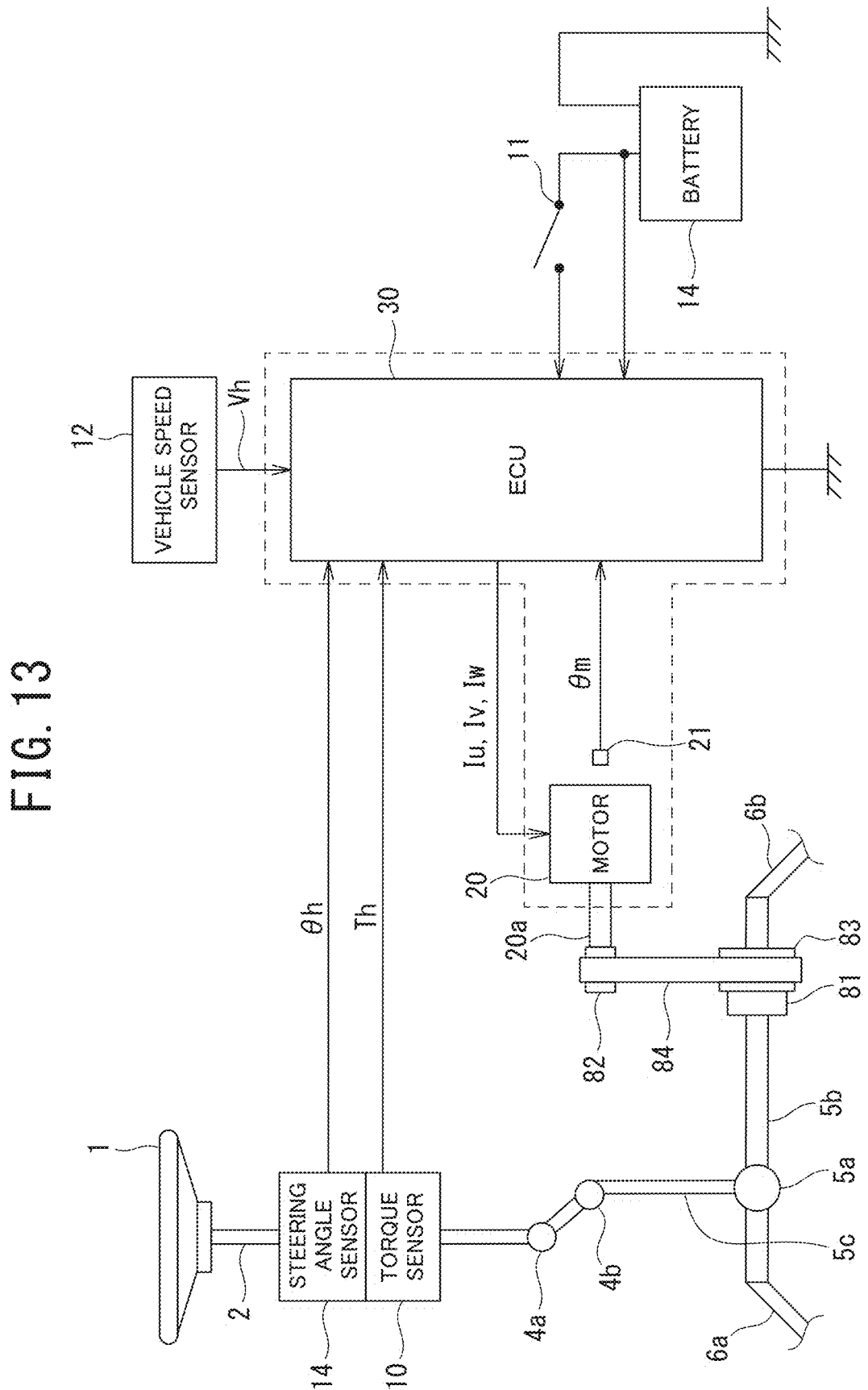
FIG. 13 is a configuration diagram illustrative of an outline of a second variation of the electric power steering device.
Figure 14:
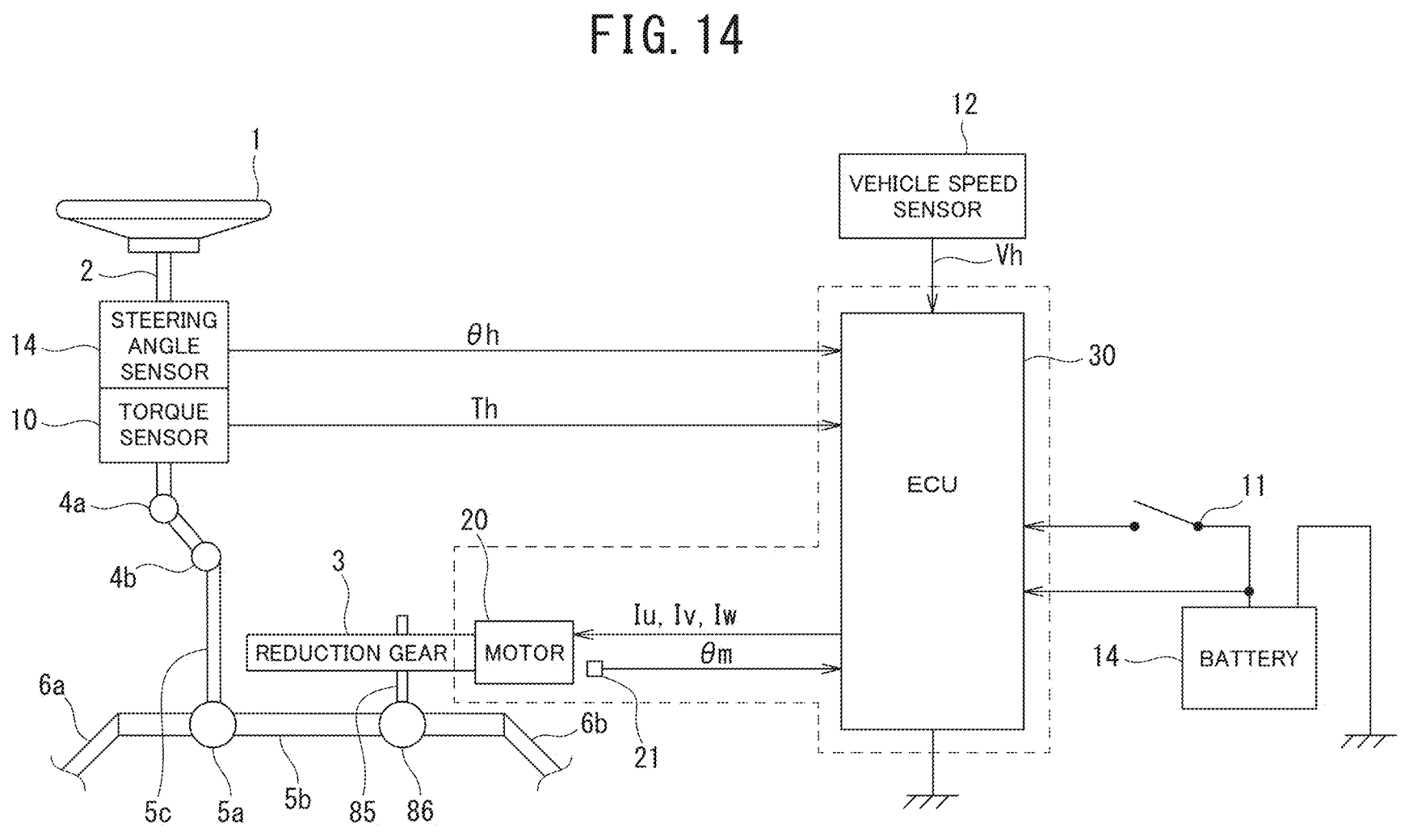

Note that, in the case of the downstream assist system, a motor 20, a rotation angle sensor 21, and an ECU 30 may, instead of being formed as separate entities, be formed as a motor control unit (MCU) having a monolithic structure as a waterproof measure, as illustrated by dashed lines in FIGS. 12 to 14.

FIG. 12 illustrates a configuration example in which the electric power conversion device of the present invention is applied to an electric power steering device using the single pinion assist system. A steering wheel 1 is connected to a universal joint 4a at one end of an intermediate shaft via a steering shaft 2. In addition, to a universal joint 4b at the other end, an input-side shaft 4c of a torsion bar (not illustrated) is coupled.

A pinion rack mechanism 5 includes a pinion gear (pinion) 5a, a rack bar (rack) 5b, and a pinion shaft 5c. The input-side shaft 4c and the pinion rack mechanism 5 are connected by the torsion bar (not illustrated) that is twisted due to a difference in rotation angles between the input-side shaft 4c and the pinion rack mechanism 5. A torque sensor 10 electromagnetically measures a torsion angle of the torsion bar as steering torque Th of the steering wheel 1.

To the pinion shaft 5c, a motor 20 assisting steering force of the steering wheel 1 is connected via a reduction gear 3, and the rotation angle sensor 21 calculates rotation angle information of a motor rotation shaft of the motor 20.

(3) FIG. 13 illustrates a configuration example in which the electric power conversion device of the present invention is applied to an electric power steering device using the rack assist system. A spiral groove (not illustrated) is formed on an outer circumferential surface of a rack bar 5b, and a spiral groove (not illustrated) of the same lead as the spiral groove of the rack bar 5b is also formed on an inner circumferential surface of a nut 81. By a plurality of rolling elements being arranged in a rolling path formed by the spiral grooves, a ball screw is formed.

A belt 84 is wound around a driving pulley 82 coupled to a rotation shaft 20a of a motor 20 assisting steering force of a steering wheel 1 and a driven pulley 83 coupled to the nut 81, and rotational motion of the rotation shaft 20a is converted to linear motion of the rack bar 5b. A rotation angle sensor 21 calculates rotation angle information of a motor rotation shaft of the motor 20.

(4) FIG. 14 illustrates a configuration example in which the electric power conversion device of the present invention is applied to an electric power steering device using the dual pinion assist system. The electric power steering device using the dual pinion assist system includes, in addition to a pinion shaft 5c and a pinion gear 5a, a second pinion shaft 85 and a second pinion gear 86, and a rack bar 5b includes first rack teeth (not illustrated) that mesh with the pinion gear 5a and second rack teeth (not illustrated) that mesh with the second pinion gear 86.

To the second pinion shaft 85, a motor 20 assisting steering force of a steering wheel 1 is connected via a reduction gear 3, and a rotation angle sensor 21 likewise calculates rotation angle information of a motor rotation shaft of the motor 20.

Advantageous Effects of Embodiment (1) An electric power conversion device of the embodiment includes: a polyphase inverter including series connections of an upper-side arm switching element and a lower-side arm switching element of a plurality of phases; a voltage command value generation unit configured to generate a q-axis voltage command value and a d-axis voltage command value for driving the polyphase inverter; a voltage command value limiting unit configured to limit the q-axis voltage command value and the d-axis voltage command value; a voltage command value conversion unit configured to convert the q-axis voltage command value and the d-axis voltage command value limited by the voltage command value limiting unit to a polyphase voltage command value; a switching control unit configured to drive, based on the q-axis voltage command value and the d-axis voltage command value limited by the voltage command value limiting unit, a first switching element, the first switching element being one switching element of the upper-side arm switching element and the lower-side arm switching element, and a second switching element, the second switching element being a switching element of the upper-side arm switching element and the lower-side arm switching element other than the first switching element, by PWM control; and a current measurement unit configured to measure current flowing through the second switching element, based on a voltage drop across a resistance element connected in series to the second switching element, The switching control unit sets a target duty ratio, the target duty ratio being a target value of a duty ratio of a period during which the first switching element is turned on to a PWM period, according to a target voltage to be applied to a load of the polyphase inverter, when the target duty ratio of a first phase, the first phase being a phase having the highest target duty ratio among a plurality of phases of the polyphase inverter, is less than or equal to a predetermined first threshold value set to less than 100%, drives the first switching element of the first phase at the target duty ratio, and when the target duty ratio of the first phase is greater than the first threshold value, drives the first switching element of the first phase at the duty ratio of 100% and also drives the first switching element of a second phase, the second phase being a phase of the plurality of phases other than the first phase, at a corrected duty ratio obtained by correcting to increase the target duty ratio of the second phase.

The voltage command value limiting unit limits the q-axis voltage command value and the d-axis voltage command value in such a way that the corrected duty ratio does not exceed a predetermined second threshold value set to less than 100%.

Because of this configuration, when phase current of a second phase that is a phase other than the first phase, which has the highest target duty ratio, is to be measured, switching noise from a switching element of the first phase can be prevented from being superimposed on a measurement value. In addition, it is possible to prevent a change in the phase current occurring due to the duty ratio of the first phase, which has the highest target duty ratio, being shifted to 100%. Further, it is possible to prevent a situation in which a period during which a second switching element of the second phase is turned on becomes excessively short and it becomes difficult to accurately detect phase current of the second phase from occurring. As a result, measurement precision of the phase current when the duty ratio of the first phase, which is a phase having the highest duty ratio in the PWM control, is high can be improved.

(2) For example, the second threshold value may be set to a value smaller than the first threshold value. In addition, for example, the second threshold value may be set according to a stabilization time, the stabilization time being a time after switching of the second switching element is performed until a measured value of the voltage drop across the resistance element detected by the current measurement unit stabilizes. In addition, for example, the second threshold value may be set in such a manner that length of a period during which a second switching element of the second phase is turned on is not less than the stabilization time.

Because of this configuration, the second threshold value can be set in such a way that even when the target duty ratio of the second phase is corrected to be increased when the duty ratio of the first phase is high, a period during which the second switching element of the second phase is turned on does not become excessively short.

(3) The voltage command value limiting unit may set a limiting gain, based on a ratio obtained by dividing a difference obtained by subtracting a dead time compensation value from a predetermined upper limit set to less than 100% by magnitude of a voltage vector of the q-axis voltage command value and the d-axis voltage command value, and by multiplying the q-axis voltage command value and the d-axis voltage command value by the limiting gain, limit the q-axis voltage command value and the d-axis voltage command value.

Because of this configuration, the q-axis voltage command value and the d-axis voltage command value can be limited in such a way that the corrected duty ratio of the second phase does not exceed the second threshold value.

(4) The electric power conversion device may include a third harmonic compensation unit configured to superimpose a third harmonic component on the polyphase voltage command value. The voltage command value limiting unit may set a limiting gain, based on a product obtained by multiplying the ratio, the ratio being obtained by dividing a difference obtained by subtracting a dead time compensation value from a predetermined upper limit set to less than 100% by magnitude of a voltage vector of the q-axis voltage command value and the d-axis voltage command value, by a coefficient, the coefficient matching a rate of decrease in amplitude of the polyphase voltage command value due to superimposition of the third harmonic component.

Because of this configuration, the q-axis voltage command value and the d-axis voltage command value can be limited in such a way that the corrected duty ratio of the second phase does not exceed the second threshold value.

(5) The voltage command value limiting unit may limit the q-axis voltage command value and the d-axis voltage command value in such a way that the corrected duty ratio in a phase having the second highest target duty ratio among a plurality of phases of the polyphase inverter does not exceed the second threshold value.

Because of this configuration, the q-axis voltage command value and the d-axis voltage command value can be limited in such a way that a period during which a second switching element in a phase having the second highest target duty ratio is turned on is not excessively short.

(6) The switching control unit may set a sum obtained by adding a difference obtained by subtracting the target duty ratio of the first phase from 100% to the target duty ratio of the second phase, as the corrected duty ratio.

Because of this configuration, it is possible to prevent a change in the phase current occurring due to the duty ratio of the first phase that has the highest target duty ratio being shifted to 100%.

REFERENCE SIGNS LIST

1 Steering wheel
2 Steering shaft
3 Reduction gear
4a, 4b Universal joint
4c Input-side shaft
5 Pinion rack mechanism
5a Pinion gear (pinion)
5b Rack bar (rack)
5c Pinion shaft
6a, 6b Tie rod
7a, 7b Hub unit
8L, 8R Steered wheel
10 Torque sensor
11 Ignition switch
12 Vehicle speed sensor
13 Battery
14 Steering angle sensor
20 Motor
20a Rotation shaft
20u U-phase coil
20v V-phase coil
20w W-phase coil
21 Rotation angle sensor
30 Electronic control unit
31 Control calculation unit
32 Gate drive circuit
33 Polyphase inverter
34 Current cut-off circuit
35 Cut-off drive circuit
36 Voltage drop measurement unit
37 Motor rotational speed calculation unit
40 Current command value calculation unit
41, 42 Subtracter
43 Current limiting unit
44 Proportional-integral control unit 45 Voltage limiting unit
46 Two-phase/three-phase conversion unit
47 Dead time compensation unit
48 Third harmonic compensation unit
49, 50, 51 Adder
52 Duty shifting unit
53 PWM control unit
54 Current calculation unit
55 Three-phase/two-phase conversion unit
56 Angular velocity conversion unit
81 Nut
82 Driving pulley
83 Driven pulley
84 Belt
85 Second pinion shaft
86 Second pinion gear

The invention claimed is:

1. An electric power conversion device comprising:
a polyphase inverter including series connections of an upper-side arm switching element and a lower-side arm switching element of a plurality of phases;
a voltage command value generation unit configured to generate a q-axis voltage command value and a d-axis voltage command value for driving the polyphase inverter;
a voltage command value limiting unit configured to limit the q-axis voltage command value and the d-axis voltage command value;
a voltage command value conversion unit configured to convert the q-axis voltage command value and the d-axis voltage command value limited by the voltage command value limiting unit to a polyphase voltage command value;
a switching control unit configured to drive, based on the q-axis voltage command value and the d-axis voltage command value limited by the voltage command value limiting unit, a first switching element, the first switching element being one switching element of the upper-side arm switching element and the lower-side arm switching element, and a second switching element, the second switching element being a switching element of the upper-side arm switching element and the lower-side arm switching element other than the first switching element, by PWM control; and
a current measurement unit configured to measure current flowing through the second switching element, based on a voltage drop across a resistance element connected in series to the second switching element,
wherein the switching control unit is configured to:
set a target duty ratio, the target duty ratio being a target value of a duty ratio of a period during which the first switching element is turned on to a PWM period, according to a target voltage to be applied to a load of the polyphase inverter;
when the target duty ratio of a first phase, the first phase being a phase having the highest target duty ratio among a plurality of phases of the polyphase inverter, is less than or equal to a predetermined first threshold value set to less than 100%, drive the first switching element of the first phase at the target duty ratio; and
when the target duty ratio of the first phase is greater than the first threshold value, drive the first switching element of the first phase at the duty ratio of 100% and also drive the first switching element of a second phase, the second phase being a phase of the plurality of phases other than the first phase, at a corrected duty ratio obtained by correcting to increase the target duty ratio of the second phase, and
the voltage command value limiting unit is configured to:
set a limiting gain, based on a ratio obtained by dividing a difference obtained by subtracting a dead time compensation value from a predetermined upper limit set to less than 100% by magnitude of a voltage vector of the q-axis voltage command value and the d-axis voltage command value; and
by multiplying the q-axis voltage command value and the d-axis voltage command value by the limiting gain, limit the q-axis voltage command value and the d-axis voltage command value in such a way that the corrected duty ratio does not exceed a predetermined second threshold value set to less than 100%.

2. The electric power conversion device according to claim 1, wherein the second threshold value is set to a value smaller than the first threshold value.

3. The electric power conversion device according to claim 1, wherein the second threshold value is set according to a stabilization time, the stabilization time being a time after switching of the second switching element is performed until a measured value of the voltage drop across the resistance element detected by the current measurement unit stabilizes.

4. The electric power conversion device according to claim 3, wherein the second threshold value is set in such a manner that length of a period during which a second switching element of the second phase is turned on is not less than the stabilization time.

5. The electric power conversion device according to claim 1 comprising
a third harmonic compensation unit configured to superimpose a third harmonic component on the polyphase voltage command value,
wherein the voltage command value limiting unit is configured to set a limiting gain, based on a product obtained by multiplying the ratio, the ratio being obtained by dividing a difference obtained by subtracting a dead time compensation value from a predetermined upper limit set to less than 100% by magnitude of a voltage vector of the q-axis voltage command value and the d-axis voltage command value, by a coefficient, the coefficient matching a rate of decrease in amplitude of the polyphase voltage command value due to superimposition of the third harmonic component.

6. The electric power conversion device according to claim 1, wherein the voltage command value limiting unit is configured to limit the q-axis voltage command value and the d-axis voltage command value in such a way that the corrected duty ratio in a phase having the second highest target duty ratio among a plurality of phases of the polyphase inverter does not exceed the second threshold value.

7. The electric power conversion device according to claim 1, wherein the switching control unit is configured to set a sum obtained by adding a difference obtained by subtracting the target duty ratio of the first phase from 100% to the target duty ratio of the second phase, as the corrected duty ratio.

8. A motor control device comprising:
the electric power conversion device according to claim 1; and
a controller configured to control the polyphase inverter driving an electric motor, based on a measurement result of the current measurement unit.

9. An electric power steering device comprising:

the motor control device according to claim 8; and a polyphase motor controlled by the motor control device, wherein the electric power steering device provides a steering system of a vehicle with steering assist force by the polyphase motor.

\* \* \* \* \*